United States Patent [19]
Shimomae et al.

[11] Patent Number: 5,327,260
[45] Date of Patent: Jul. 5, 1994

[54] IMAGE PROCESSING APPARATUS FOR SMOOTHING EDGES OF IMAGE

[75] Inventors: Mutsuo Shimomae, Yokosuka; Masayoshi Watanuki; Shinichiro Nishioka, both of Yokohama, all of Japan

[73] Assignee: Ricoh Company, Ltd., Japan

[21] Appl. No.: 980,964

[22] Filed: Nov. 24, 1992

[30] Foreign Application Priority Data

Nov. 28, 1991 [JP] Japan ................................. 3-314928
Nov. 11, 1992 [JP] Japan ................................. 4-301395

[51] Int. Cl.$^5$ ........................ H04N 1/417; H04N 1/40
[52] U.S. Cl. ........................ 358/448; 358/261.1; 358/261.2; 358/261.3; 358/430; 358/445; 382/30; 382/54
[58] Field of Search ............... 358/261.1, 261.2, 261.3, 358/430, 445; 382/30, 54

[56] References Cited

U.S. PATENT DOCUMENTS

| | | | |
|---|---|---|---|
| 4,544,922 | 10/1985 | Watanabe et al. | 340/728 |
| 4,618,846 | 10/1986 | Ross et al. | 358/261.1 |
| 4,878,124 | 10/1989 | Tsujimoto et al. | 358/261.1 |
| 5,058,187 | 10/1991 | Kim | 358/261.2 |
| 5,077,812 | 12/1991 | Kanno et al. | 358/261.2 |
| 5,091,976 | 2/1992 | Murayama | 358/261.3 |
| 5,093,870 | 3/1992 | Watanabe | 382/54 |
| 5,093,872 | 3/1992 | Tutt | 358/261.3 |

FOREIGN PATENT DOCUMENTS 2-112966 4/1990 Japan ......................................... 2/485

Primary Examiner—Edward L. Coles, Sr.
Assistant Examiner—Kimberly A. Williams
Attorney, Agent, or Firm—Mason, Fenwick & Lawrence

[57] ABSTRACT

An image processing system for smoothing edges of an image, includes a sampling part for sampling a group of dots from an image having a plurality of input black and white dots, the group of dots having a target dot at the center of a region and being sampled for each dot of the image, a recognition part for recognizing a dot pattern from the sampled dots, the dot pattern described by successive black dots and located at a boundary between a black dot region and a white dot region, and for producing code signals from the result of the recognition to define features of the dot pattern for each target dot, a discrimination part for detecting whether or not each target dot is part of an inclined line having a gradient relative to horizontal or vertical direction in response to the code signals, thus determining whether or not each target dot is to be corrected, a correction part with a memory, for inputting the code signals to the memory as address inputs when the dot is to be corrected, and for outputting a corresponding correction dot data from the memory in accordance with the code signals, and an output part for outputting an image with corrected dots which are in accordance with the correction dot data of the correction part.

20 Claims, 35 Drawing Sheets

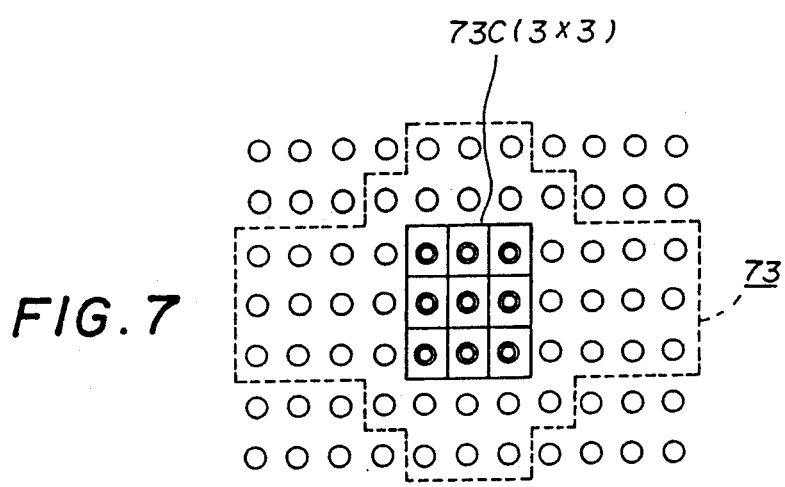
FIG. 7
FIG. 8A  FIG. 8B  FIG. 8C  FIG. 8D
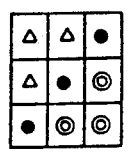 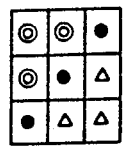 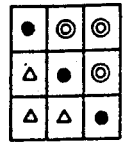 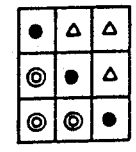
FIG. 9A  FIG. 9B  FIG. 9C  FIG. 9D
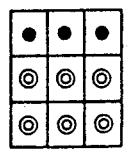 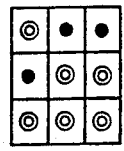 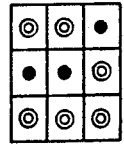 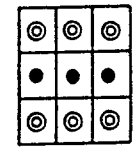
FIG. 9E  FIG. 9F  FIG. 9G
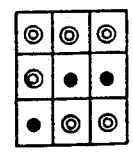 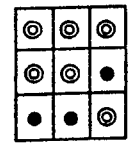 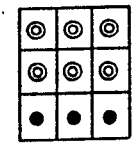
FIG. 10A  FIG. 10B  FIG. 10C  FIG. 10D
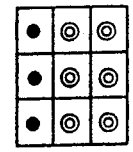 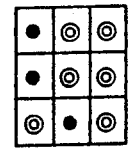 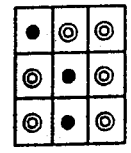 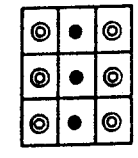
FIG. 10E  FIG. 10F  FIG. 10G
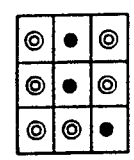 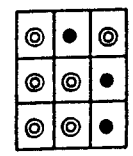 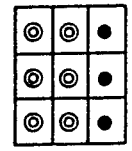

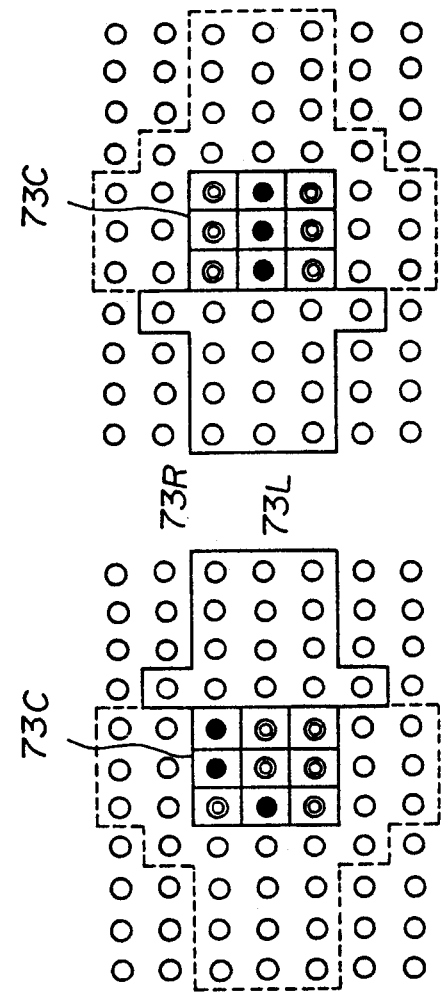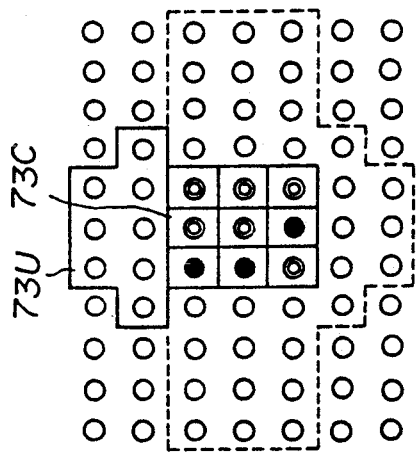

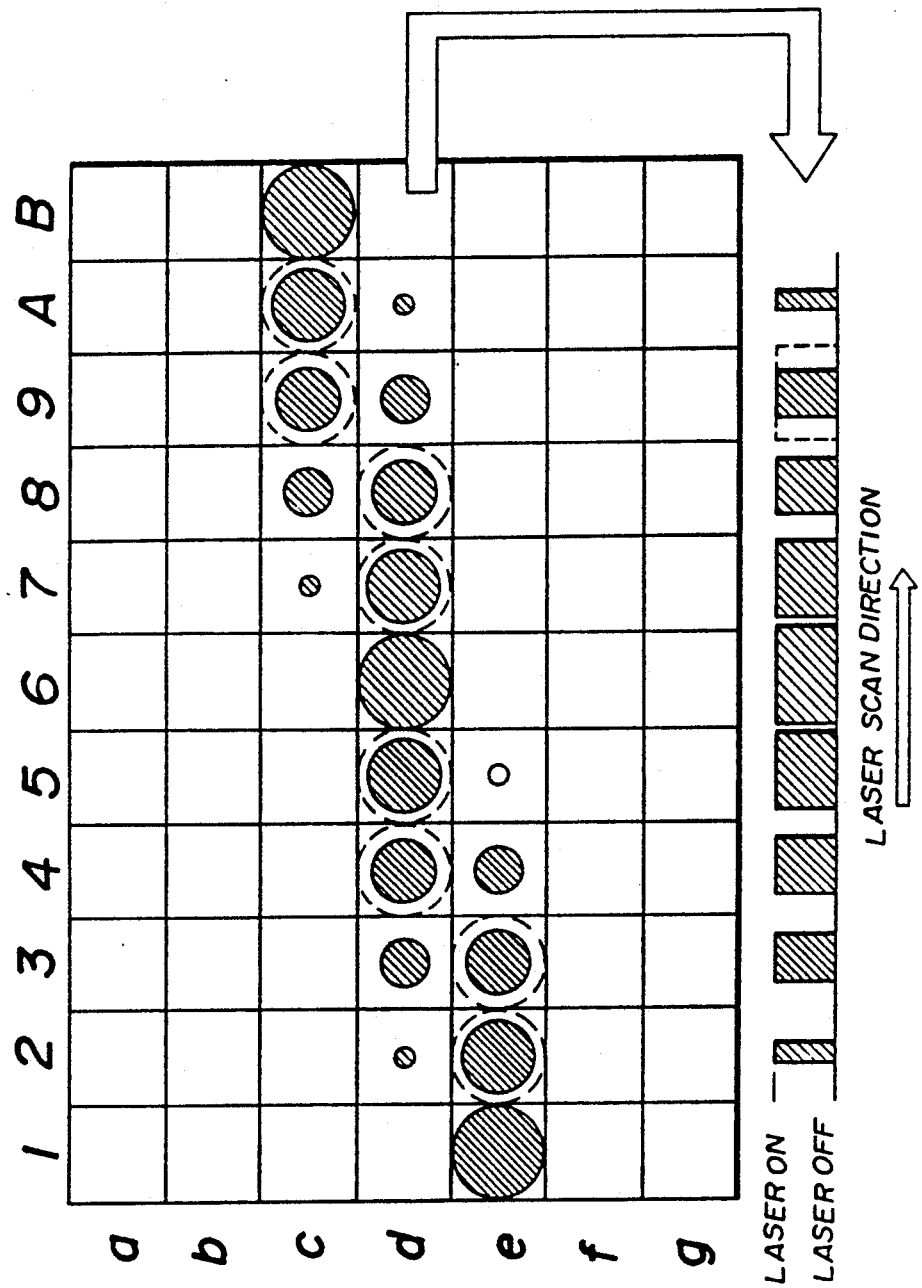

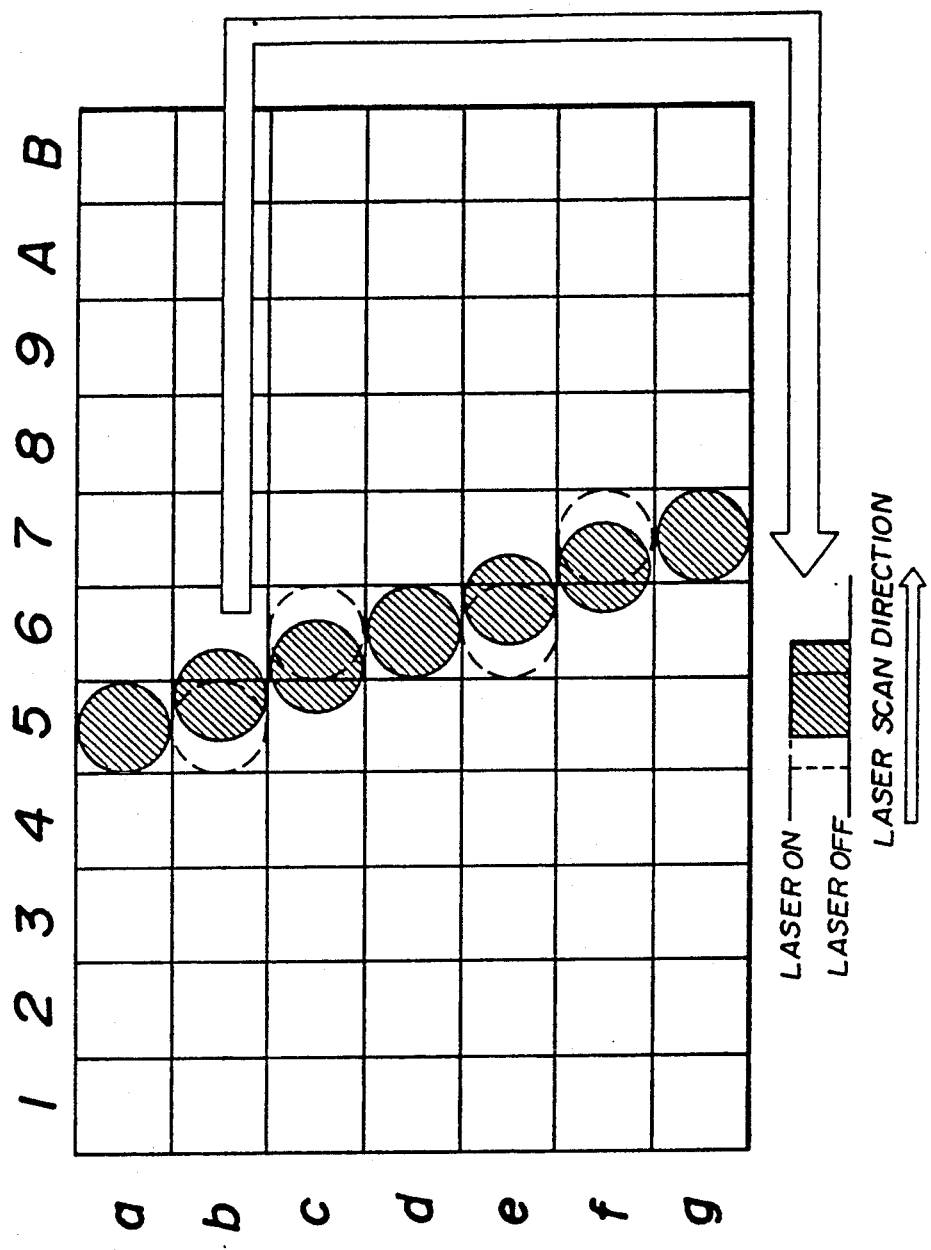

FIG. 21A

| SIGNAL | FIG.14 | FIG.15 |
|---|---|---|
| H/V | 1 | 0 |
| DIRI<br>DIRO | 0<br>1 | 1<br>0 |
| B/W | 0 | 1 |
| U/L | 0 | - |
| GST | 1 | 1 |
| RUC | 1 | 1 |
| LLC | 0 | 0 |
| CCI<br>CCO | 1<br>0 (2) | 1<br>0 (2) |
| RUASI<br>RUASO | 0<br>0 | 1<br>0 |
| LLASI<br>LLASO | -<br>- | -<br>- |

FIG. 21B

| SIGNAL | FIG.14 | FIG.15 |
|---|---|---|
| RUCN2<br>RUCN1<br>RUCN0 | 0<br>1 (3)<br>1 | 0<br>0 (1)<br>1 |
| RUDIRI<br>RUDIRO | 0<br>1 | 1<br>0 |
| LLCN2<br>LLCN1<br>LLCN0 | -<br>-<br>- | -<br>-<br>- |
| LLDIRI<br>LLDIRO | -<br>- | -<br>- |

FIG. 21C
(GRADIENT)

| SIGNAL | FIG.14 | FIG.15 |
|---|---|---|
| G3<br>G2<br>G1<br>G0 | 0<br>1 (5)<br>0<br>1 | 0<br>0 (3)<br>1<br>1 |
| NO_ notch | 0 | 0 |

FIG. 21D
(POSITION)

| SIGNAL | FIG.14 | FIG.15 |
|---|---|---|
| P3<br>P2<br>P1<br>P0 | 0<br>0 (1)<br>0<br>1 | 0<br>0 (1)<br>0<br>1 |

NEAR HORIZONTAL / VERTICAL

|    | 1 | 2 | 3 | 4 | 5 | 6 | 7 | 8 | 9 | 10 | 11 | 12 | 13 | 14 | 15 | 16 | 17 | 18 | 19 | 20 | 21 |
|----|---|---|---|---|---|---|---|---|---|----|----|----|----|----|----|----|----|----|----|----|----|
| 1  |   |   |   |   |   |   |   |   |   |    |    |    |    |    |    |    |    |    |    |    |    |
| 2  |   |   |   |   |   |   |   |   |   |    |    |    |    |    |    |    |    |    |    |    |    |
| 3  |   |   |   |   |   |   | V | V | V | V  | V  | V  | V  |    |    |    |    |    |    |    |    |
| 4  |   |   |   | V | V | V |   |   |   |    |    |    |    | V  | V  | V  | V  |    |    |    |    |
| 5  |   | V | V | V | V |   |   |   |   |    |    |    |    |    | V  | V  | V  | V  |    |    |    |
| 6  |   |   | V | V | V | V |   |   |   |    |    |    |    |    | V  | V  | V  | V  |    |    |    |
| 7  | V | V | V | V | V |   |   |   |   |    |    |    |    |    | V  | V  | V  | V  | V  |    |    |
| 8  |   |   |   |   |   |   |   |   |   |    |    |    |    |    | V  | V  | V  | V  | V  |    |    |
| 9  |   |   |   |   |   |   |   |   |   |    |    |    |    |    | V  | V  | V  | V  | V  |    |    |
| 10 |   |   |   |   |   |   |   |   |   |    |    |    |    |    | V  | V  | V  | V  | V  |    |    |
| 11 |   |   |   |   |   |   |   |   |   |    |    | V  | V  | V  | V  | V  | V  | V  |    |    |    |
| 12 |   |   |   | V | V | V | V | V |   |    |    |    |    | V  | V  | V  | V  | V  |    |    |    |
| 13 |   | V | V | V | V | V |   |   |   |    |    |    |    | V  | V  | V  | V  | V  |    |    |    |
| 14 |   | V | V | V | V | V |   |   |   |    |    |    |    | V  | V  | V  | V  | V  |    |    |    |
| 15 |   | V | V | V | V | V |   |   |   |    |    |    |    | V  | V  | V  | V  | V  |    |    |    |
| 16 | V | V | V | V | V | V |   |   |   |    |    |    |    | V  | V  | V  | V  | V  |    |    |    |
| 17 | V | V | V | V | V | V |   |   |   |    |    |    |    | V  | V  | V  | V  | V  |    |    |    |
| 18 | V | V | V | V | V | V |   |   |   |    |    |    | V  | V  | V  | V  | V  | V  |    |    |    |
| 19 |   | V | V | V | V | V |   |   |   |    |    | V  | V  | V  | V  | V  | V  | V  |    |    |    |
| 20 |   | V | V | V | V | V |   | V | V | V  | V  |    |    | V  | V  | V  | V  | V  | V  |    |    |
| 21 |   |   | V | V | V | V | V | V | V |    |    |    |    |    | V  | V  | V  | V  | V  | V  | V  |
| 22 |   |   |   |   |   |   |   |   |   |    |    |    |    |    |    |    |    |    |    |    |    |
| 23 |   |   |   |   |   |   |   |   |   |    |    |    |    |    |    |    |    |    |    |    |    |

FIG. 26
DIRECTION

|    | 1 | 2 | 3 | 4 | 5 | 6 | 7 | 8 | 9 | 10 | 11 | 12 | 13 | 14 | 15 | 16 | 17 | 18 | 19 | 20 | 21 |
|----|---|---|---|---|---|---|---|---|---|----|----|----|----|----|----|----|----|----|----|----|----|
| 1  |   |   |   |   |   |   |   |   | O |    |    | O  |    |    |    |    |    |    |    |    |    |
| 2  |   |   |   |   |   |   |   | O | 1 | 1  | 1  | 1  | 1  | 1  | O  | O  |    |    |    |    |    |
| 3  |   |   |   |   | O | O |   |   |   |    |    |    |    |    |    | O  |    |    |    |    |    |
| 4  |   |   |   |   |   |   |   |   | O | 1  | 1  | O  |    |    |    |    |    |    |    |    |    |
| 5  |   |   |   | O |   |   |   |   | 1 | 1  | 1  | 1  | 1  | 1  |    |    |    |    | O  |    |    |
| 6  |   |   | O |   |   |   | O |   |   |    |    |    |    | O  |    |    |    |    | O  |    |    |
| 7  | O | O |   |   |   |   | O |   |   |    |    |    |    | O  | O  |    |    |    | O  | O  |    |
| 8  |   |   |   |   |   |   |   |   |   |    |    |    |    | O  | O  |    |    |    | O  |    |    |
| 9  |   |   |   |   |   |   |   |   |   |    |    |    |    |    |    |    |    |    | O  |    |    |
| 10 |   |   |   |   |   |   |   |   | O | O  | O  | O  | O  | O  |    |    |    |    |    |    |    |
| 11 |   |   |   |   |   |   | O | O | O | O  | O  | O  | O  |    |    |    |    |    |    |    |    |
| 12 |   |   |   |   |   |   | O |   |   |    |    |    | O  | O  |    |    |    |    |    |    |    |
| 13 |   |   |   |   |   |   |   |   | O | O  | O  | O  | O  | O  |    |    |    |    |    |    |    |
| 14 | O |   |   |   |   |   |   | O | O | O  |    |    |    | O  | O  |    |    |    |    |    |    |
| 15 | O |   |   |   |   | 1 |   |   |   |    |    |    |    | O  | O  |    |    |    |    |    |    |
| 16 | O | 1 |   |   | O | 1 |   |   |   |    |    |    |    |    | O  |    |    |    | O  |    |    |
| 17 |   | 1 |   |   | O | 1 |   |   |   |    |    |    |    |    |    |    |    |    | O  |    |    |
| 18 | O | 1 |   |   |   | 1 |   |   |   |    |    | O  |    |    |    |    |    |    |    |    |    |
| 19 |   | O |   |   |   |   |   | 2 | 2 | 2  | 2  | O  |    |    |    |    |    |    |    |    |    |
| 20 |   |   |   |   |   |   |   |   | O | O  |    |    |    |    |    |    |    |    |    |    |    |
| 21 |   |   |   |   |   |   |   |   |   |    |    | O  |    |    |    |    |    |    |    |    |    |
| 22 |   |   |   |   |   | 2 | 2 | 2 | 2 | 2  | 2  | O  |    |    |    |    |    |    | O  | O  | O  |
| 23 |   |   |   |   |   |   | O |   |   | O  |    |    |    |    |    |    |    |    | O  |    |    |

FIG. 27
UPPER / LOWER

|    | 1 | 2 | 3 | 4 | 5 | 6 | 7 | 8 | 9 | 10 | 11 | 12 | 13 | 14 | 15 | 16 | 17 | 18 | 19 | 20 | 21 |
|----|---|---|---|---|---|---|---|---|---|----|----|----|----|----|----|----|----|----|----|----|----|
| 1  |   |   |   |   |   |   |   |   |   |    |    |    |    |    |    |    |    |    |    |    |    |
| 2  |   |   |   |   |   |   |   |   | U | U  | U  | U  |    |    |    |    |    |    |    |    |    |
| 3  |   |   |   |   |   |   |   |   |   |    |    |    |    |    | U  |    |    |    |    |    |    |
| 4  |   |   |   |   |   |   |   |   |   |    |    |    |    |    |    |    |    |    |    |    |    |
| 5  |   |   |   |   |   |   |   | U | U | U  | U  | U  | U  |    |    |    |    | U  |    |    |    |
| 6  |   |   |   |   |   |   | U |   |   |    |    |    |    |    |    |    |    |    | U  |    |    |
| 7  |   |   | U |   |   |   | U |   |   |    |    |    |    |    | U  |    |    |    | U  |    |    |
| 8  |   |   |   |   |   |   | U |   |   |    |    |    |    |    | U  |    |    |    | U  |    |    |
| 9  |   |   |   |   | U | U |   |   |   |    |    |    |    |    |    |    |    |    | U  |    |    |
| 10 |   |   |   |   |   |   |   |   |   |    |    |    |    |    |    |    |    |    | U  |    |    |
| 11 |   |   |   |   |   |   |   |   | U | U  | U  | U  |    |    |    |    |    |    | U  |    |    |
| 12 |   |   |   |   | U |   |   |   |   |    |    |    |    |    |    |    |    |    | U  |    |    |
| 13 |   |   |   |   |   |   |   |   |   |    | U  | U  | U  |    |    |    |    |    | U  |    |    |
| 14 |   |   |   |   |   |   | U | U | U |    |    |    |    |    | U  |    |    |    | U  |    |    |
| 15 |   |   |   |   |   | U |   |   |   |    |    |    |    |    | U  |    |    |    | U  |    |    |
| 16 |   | U |   |   |   | U |   |   |   |    |    |    |    |    |    |    |    |    | U  |    |    |
| 17 |   | U |   |   |   | U |   |   |   |    |    |    |    |    |    |    |    |    | U  |    |    |
| 18 |   | U |   |   |   | U |   |   |   |    |    |    |    |    |    |    |    |    | U  |    |    |
| 19 |   |   |   |   |   |   |   |   |   |    |    |    |    |    |    |    |    |    |    |    |    |
| 20 |   |   |   |   |   |   |   | U | U |    |    |    |    |    |    |    |    |    |    |    | U  |
| 21 |   |   |   |   |   |   |   |   |   |    |    |    |    |    |    |    |    |    |    |    | U  |
| 22 |   |   |   |   |   |   |   |   |   |    | U  |    |    |    |    |    |    |    |    |    | U  |
| 23 |   |   |   |   | U | U | U | U |   |    |    |    |    |    |    |    |    | U  | U  |    |    |

FIG. 28
GRADIENT

FIG. 29
POSITION / SCAN LINE COUNT

FIG. 30

ONE DET

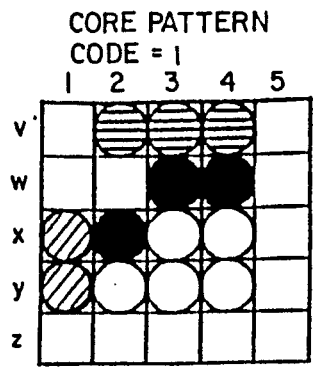
FIG. 33A
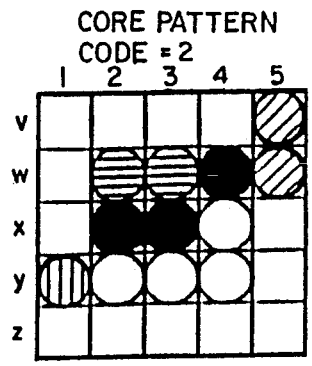
FIG. 33B
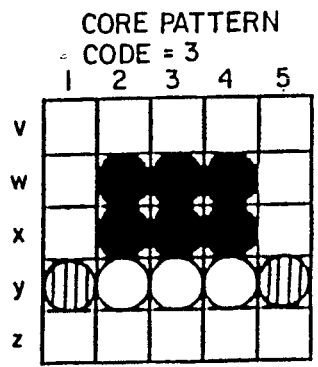
FIG. 33C
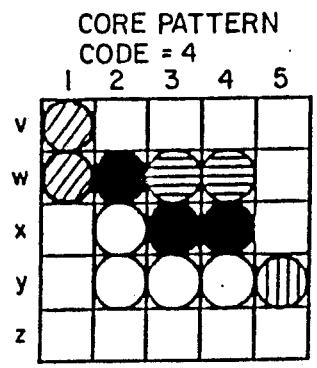
FIG. 33D
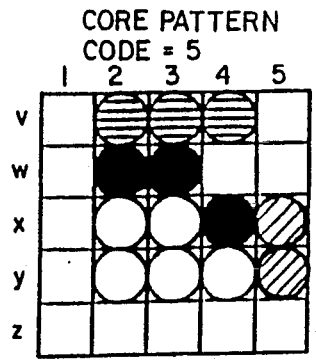
FIG. 33E
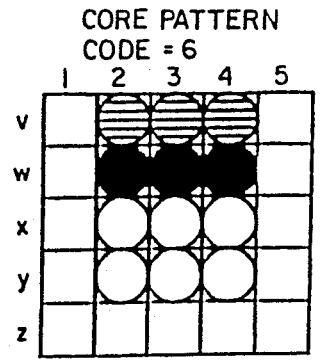
FIG. 33F
FIG. 33N
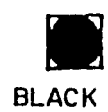 BLACK     WHITE     ONE OF TWO DOTS: BLACK
 FOR ONE DOT LINE CHECK     FOR LINE CONTINUITY CHECK     NO CARE Line Arc

FIG. 50

| RAM address | | DIR=0 | DIR=1 | DIR=2 | DIR=3 | | | | | | | | |
|---|---|---|---|---|---|---|---|---|---|---|---|---|---|
| A11 | H/V | H/V | H/V | H/V | H/V | | | | | | | | |
| A10 | DIR1 | line / or \ | arc ∩ | arc ∪ | no match | | | | | | | | |
| A9 | DIR0 | | | | | | | | | | | | |
| A8 | U/L | U/L | U/L | U/L | U/L | | | | | | | | |
| A7 | B/W | B/W | B/W | B/W | B/W | | | | | | | | |
| A6 | G2 (GRADIENT) | G=1~7 | G=0~7 | G=0~7 | G=0 | G=1 | G=2 | G=3 | G=4 | G=5 | G=6 | G=7 | |
| A5 | G1 | | | | window miss hit | window #1 hit | window #3 hit | window #2 hit | window #4 hit | window #5 hit | window #6 hit | vertical or horizontal line | |
| A4 | G0 | | | | | | | | | | | | |
| A3 | P3 (POSITION) | one dot line | one dot line | one dot line | one | | | | | | | | |
| A2 | P2 | P=1~7 | P=1~7 | P=1~7 | all black | | | | | | | | |
| A1 | P1 | | | | scan line count | | | | | | | | |
| A0 | P0 | | | | | | | | | | | | |

IMAGE PROCESSING APPARATUS FOR SMOOTHING EDGES OF IMAGE

BACKGROUND OF THE INVENTION

The present invention generally relates to an image processing apparatus, and more particularly to an image processing apparatus, which is applicable to image forming systems such as a laser printer, a digital copier and a facsimile machine, for eliminating distortions from an image so that an image with smooth edges is produced.

In image forming systems such as dot matrix printers and display devices, a line image such as a character which is described by lines is converted into a dot image using font data, and a dot image such as a photograph which is described by dots is read by an image scanner from a original image. These images are quantized or digitized into binary image data, and stored, for example, in a video data area of a memory (e.g., a random access memory RAM) in the image forming system. A bit mapped image is thus produced in the memory as the result of the quantization. The bit mapped image is read out from the memory, and this image is supplied to an image forming part or a displaying device, so that the image is printed on a recording sheet, or displayed on a CRT (cathode ray tube) screen.

When an analog image is formed by an image forming system, the elements of the image are continuous at any location in all directions. However, when a digital image expressed in binary data after quantization, or a bit mapped image described by dots arranged in columns and lines (dot matrix formation) is formed, it is difficult to produce a continuous image from the bit mapped image. Generally, distortions are produced at edges of the image when a digital image is output (printed or displayed). Also, when an image of an inclined line having a gradient at a certain angle to the horizontal or vertical direction is output, the image edges appear jagged. It is difficult to produce a desired continuous image which is the same as the original image with no distortion.

One conceivable method for effectively eliminating distortions from the output image is to increase dot density of the output image by reducing the size of each dot of the bit mapped image so that a high resolution is obtained for the output image. However, in order to obtain a high resolution for the output image, it is necessary to increase remarkably the cost of the image forming system needed to apply such a method to the image forming. For example, in order to increase the resolution of a bit mapped image described by 300×300 dots per inch (dpi) to a 600×600 dpi resolution which is twice as high as the original resolution, it is necessary that the capacity of the memory and the speed of data processing are made four times higher than those of the original image forming system.

Another method for eliminating the distortion from the output image is to use an interpolation technique. By using the interpolation technique, an input image with staircase-like irregular edges is converted into an output image with a continuous slope. Or, by averaging intensities of adjacent dots of an input image, such irregular edges of the image are corrected to an output image with edges having smoothly changing intensities. However, when the interpolation is used, fine details are eliminated from the input image, and there is a problem in that the output image has a poor contrast and a low resolution.

In order to resolve the above mentioned problems, there has been proposed a smoothing device for smoothing edges of a displayed character. U.S. Pat. No. 4,544,922 discloses a smoothing device for a display apparatus. In the smoothing device disclosed in this patent, a display image of a character composed of selected standard width dots of a matrix of orthogonally disposed rows and columns is smoothed in response to data stored in a memory. The smoothing involves the selective addition of small dots having a predetermined width to particular portions of the character, and the selective removal of such dots. In the disclosed device, conventional pattern recognition or template matching is performed, in order to detect the particular portions of the character to be smoothed.

However, in the above smoothing device, pattern recognition or template matching is performed for each position of dots of a bit mapped image so that the small dot is added to or removed from the detected portions of the character in accordance with the result of the pattern recognition or template matching. Therefore, the above smoothing device is very expensive, and requires a long processing time for obtaining a smoothed character image with a high picture quality.

Moreover, in order to eliminate the above described problem, there has been proposed an image forming apparatus. Japanese Laid-Open Patent Publication No. 2-112966 discloses this type of an image forming apparatus. In the image forming apparatus of this publication, template matching is performed by comparing each subset of dots (including a target dot and neighboring dots thereof) of an input image (a bit mapped image) with one of predetermined patterns of dots which are stored in a memory as templates. The predetermined patterns of dots of each template include specified features of a bit mapped image for each input image. If one subset of dots of the input image including a target dot matches with one of the predetermined patterns, the subset of dots of the input image is replaced by a subset of compensation dots corresponding to the pattern with which the subset has matched, in order to improve the quality of the output image.

However, in order to accomplish the image forming with improved quality when the above mentioned image processing apparatus is used, it is necessary that a large number of predetermined patterns of dots (or templates) including specified features of a bit mapped image for any input image is prepared and stored in the memory. The memory must have a very great capacity to store the large number of predetermined patterns of dots. The time and labor needed to prepare and store such dot patterns are considerable.

It is also necessary that the template matching to detect specified features of a bit mapped image is performed with respect to each target dot of the input image. Thus, when the above described image forming apparatus is used, the template matching is time consuming.

SUMMARY OF THE INVENTION

Accordingly, it is a general object of the present invention to provide an improved image processing system in which the above described problems are eliminated.

Another, more specific object of the present invention is to provide an image processing system in which a distortion such as a jagged boundary between a black dot region and a white dot region is effectively eliminated from a digital image through dot correction, so that an image having smooth edges is produced with increased picture quality.

Still another object of the present invention is to provide an image processing system which minimizes the amount of correction data stored in a memory needed for the dot correction and which efficiently performs data processing to eliminate the distortion from the digital image in a short time.

The above mentioned objects of the present invention are achieved by an image processing system which includes a sampling part for sampling a group of dots from an image having a plurality of input black and white dots arranged in columns and lines, the group of dots being included in a prescribed region of the image and having a prescribed two-dimensional size, the group of dots being sampled with respect to each dot of the image and including a target dot at the center of the region, a pattern recognition part for recognizing a line from the sampled dots of the sampling part, the line being described by successive black dots and located at a boundary between a black dot region of the image and a white dot region thereof, and for producing a plurality of code signals assigned to each target dot from the result of the recognition, the code signals defining features of the recognized line with respect to each target dot, a discrimination part for detecting whether or not each target dot is part of an inclined line having a gradient relative to the horizontal or vertical direction, in response to at least one of the code signals of the pattern recognition part, so that it is determined whether or not each target dot is to be corrected in order for smoothing edges of the image, a correction part having a pattern memory in which a set of predetermined correction dot data is stored, for transferring the code signals of the pattern recognition part to the pattern memory as address inputs when it is determined that the target dot is to be corrected, and for reading predetermined correction dot data from the pattern memory in accordance with the code signals of each target dot, and an output part for outputting an image with dots which are supplied from the correction part with respect to each target dot. According to the present invention, it is possible to efficiently produce an image having smooth edges with increased picture quality by eliminating distortions from the image.

Other objects and further features of the present invention will become apparent from the following detailed description when read in conjunction with the accompanying drawings.

BRIEF DESCRIPTION OF THE DRAWINGS

FIG. 7 is a diagram for explaining core and peripheral regions of the window provided in the dot corrector shown in FIG. 5;

FIGS. 8A through 8D are diagrams showing a set of matching patterns for detecting a 45-degree line from a dot pattern in the core region of the window;

FIGS. 9A through 9G are diagrams showing a set of matching patterns for recognizing a nearly horizontal line from a dot pattern in the core region of the window;

FIGS. 10A through 10G are diagrams showing a set of matching patterns for recognizing a nearly vertical line from a dot pattern in the core region of the window;

FIGS. 11A through 11D are diagrams showing right-hand, left-hand, upper and lower peripheral regions of the window shown in FIG. 7;

FIG. 19 is a diagram for explaining a dot correction performed with respect to the nearly horizontal line in the window shown in FIG. 14;

FIG. 20 is a diagram for explaining a dot correction process performed with respect to the nearly vertical line in the window shown in FIG. 15;

FIGS. 21A through 21D are charts showing the results of pattern recognition with respect to each of the dot patterns shown in FIGS. 14 and 15;

FIGS. 23 through 30 are diagrams showing the results of several steps of the pattern recognition and dot correction performed with respect to each target dot of the image shown in FIG. 22;

FIGS. 33A through 33M are diagrams showing 5 ×5 core matching patterns for use in a dot pattern recognition of the second embodiment;

FIGS. 33N and 33O are keys to interpretation of symbols within FIGS. 33A-33M.

FIG. 50 is a diagram showing a code assignment of the pattern memory used in the image processing apparatus according to the present invention.

DESCRIPTION OF THE PREFERRED EMBODIMENTS

Figure 2:
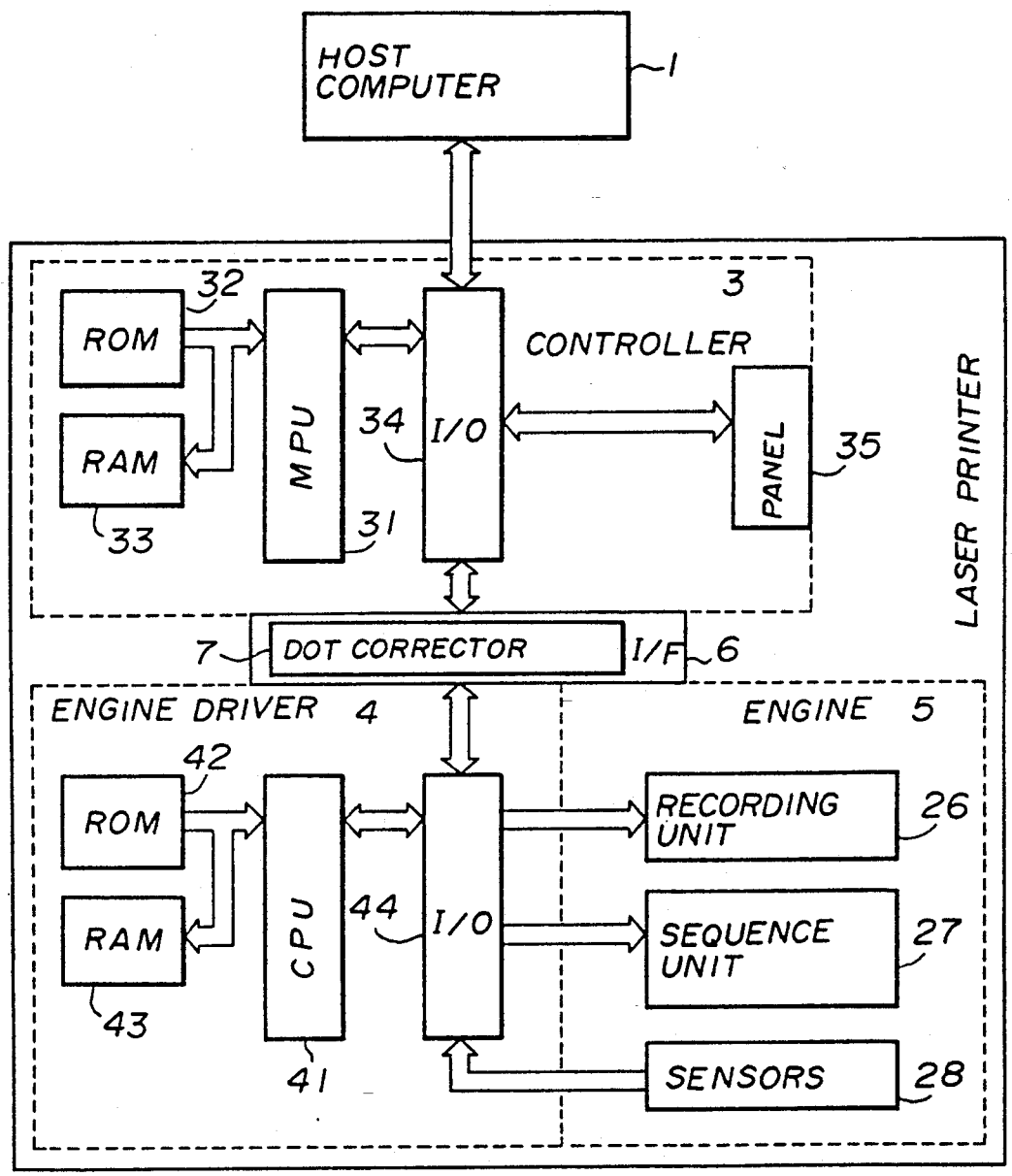
FIG. 2 is a block diagram showing an image forming system to which the image processing apparatus of the present invention is applied.

A description will now be given of an image forming system to which an image processing apparatus according to the present invention is applied. FIG. 2 shows a laser beam printer 2 connected to a host computer 1 as the image forming system. This laser beam printer 2 includes a controller 3, an engine driver 4, a printer engine 5, and an internal interface (I/F) 6. The printer 2 receives print data which is an input image from the host computer 1. In accordance with the print data, the controller 3 produces a bit mapped image of a page frame in a memory for each page of the input image. The controller 3 converts the bit mapped image into image data, and the image data is used to drive a light source of a recording unit so that a pattern of dots is output in accordance with the image data.

The image data is transferred from the controller 3 to the engine driver 4 via the interface 6. In accordance with the image data, the engine driver 4 sequentially controls the operation of the parts of the printer engine 5, so that the recording unit of the printer engine 5 records a visible image.

A dot corrector 7, which is the image processing apparatus according to the present invention, is provided within the internal interface 6, and the image data from the controller 3 is subjected to the dot correction performed by the dot corrector 7, in order to improve the picture quality. The dot correction will be described later in detail.

The controller 3 includes a microprocessor unit (MPU) 31, a read-only memory (ROM) 32, a random-access memory (RAM) 33, an input-output unit (I/O) 34, and an operations panel 35. The MPU 31 of the controller 3 is connected to the host computer 1 via the I/O unit 34. In the ROM 31, programs, constant data and character fonts required for carrying out the dot correction are stored. In the RAM 33, temporarily produced intermediate data and sets of reference dot patterns used for pattern recognition are stored. The I/O unit 34 serves to control a flow of data being transferred between the host computer 1 and the internal interface 6. The operations panel 35 is connected to the MPU 31 via the I/O unit 34. The above mentioned component units of the controller 3 are interconnected via system buses including data buses, address buses and control buses, as shown in FIG. 2. The dot corrector 7 provided in the internal interface 6 is connected to the MPU 31 via the I/O unit 34.

The engine driver 4 includes a secondary microprocessor unit (CPU) 41, a read-only memory (ROM) 42, a random-access memory (RAM) 43, and an input-output (I/O) unit 44. The ROM 42 stores programs and constant data, which are needed for the CPU 41 to control operations of the printer engine 5. The RAM 43 stores intermediate data being temporarily produced by the CPU 41. The I/O unit 44 serves to control a flow of data being conveyed between the interface 6 and the CPU 41 and that between the CPU 41 and the printer engine 5. The component parts of the engine driver 4 are interconnected via system buses including data buses, address buses and control buses, as shown in FIG. 2.

The I/O unit 44 of the engine driver 4 is connected to the internal interface 6. The I/O unit 44 receives the image data from the controller 3, and on/off state signals of keys on the operations panel 35 from the controller 3. The I/O unit 44 of the engine driver 4 transfers sync signals (such as a pixel clock WCLK) and state signals (such as a signal for detecting the paper end) to the controller 3.

The printer engine 5 includes a recording unit 26, a number of sequence control units 27, and a number of detecting sensors 28. The I/O unit 44 of the engine driver 4 is also connected to the recording unit 26, the units 27, and the sensors 28 of the printer engine 5 via system buses.

The controller 3 receives a print command from the host computer 1, and print data including text and/or graphics from the host computer 1. The controller 3 produces a bit mapped image from the received print data. If the print data includes text data, the controller 3 produces a bit mapped image (a pattern of dots needed for image recording) by using the character font data stored in the ROM 32. The controller 3 produces such a bit mapped image corresponding to the print data (containing text and graphics) and stores it in a video data area of the RAM 33 page by page.

In response to a ready-state signal and the pixel clock WCLK received from the engine driver 4, the controller 3 outputs the image data of the bit mapped image (the pattern of dots) in the video data area of the RAM 33 to the engine driver 4 via the internal interface 6 in synchronism with the clock WCLK. According to the present invention, such image data is subjected to the dot correction performed by the dot corrector 7, which will be described later.

On the operations panel 35 of the controller 3, key switches and indicators (not shown) are provided. The operations panel 35 serves to control data processing in accordance with operator inputs, to transfer the processed data to the engine driver 4, and to indicate the state of the laser beam printer by means of the indicators.

In accordance with the corrected image data received from the dot corrector 7 of the interface 6, the engine driver 4 sequentially controls the operation of the recording unit 26 and the units 27 of the printer engine 5. The engine driver 4 outputs the image data (the pattern of dots needed for image recording) to the recording unit 26 of the printer engine 5. The engine driver 4 receives sync signals and state signals from the sensors 28, the state signals indicating the respective states of the parts of the printer engine 5. The engine driver 4 outputs the state signals (e.g., the signal for detecting the paper end) to the controller 3 via the interface 6.

Figure 3:
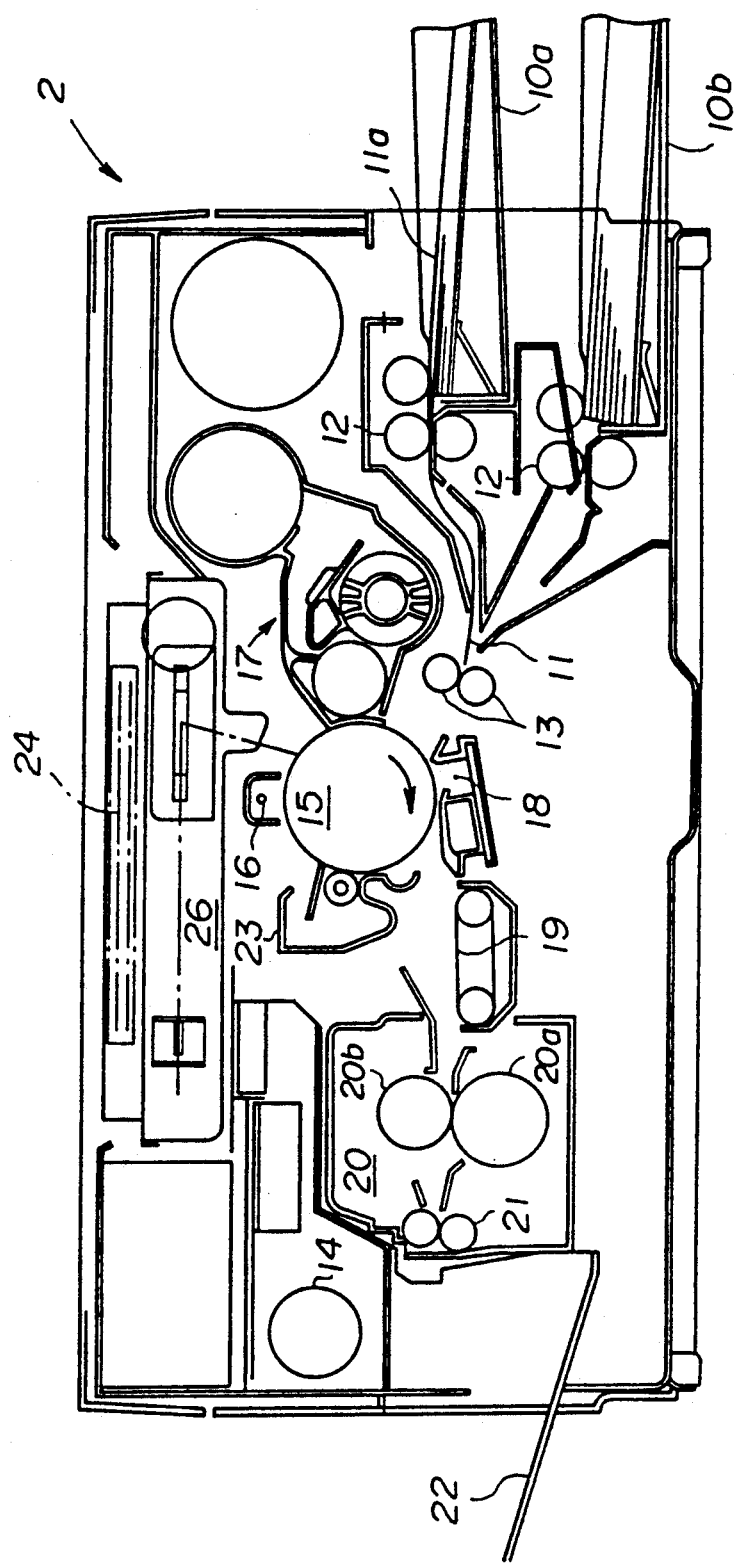
FIG. 3 is a sectional view showing a mechanical part of the image forming system shown in FIG. 2.

FIG. 3 shows a mechanical part of the laser beam printer 2 shown in FIG. 2. In the laser beam printer 2, a sheet 11 is supplied from either of upper and lower paper cassettes 10a and 10b to a pair of registration rollers 13 in a paper transport path. The upper and lower paper cassettes 10a and 10b contain sheets of paper of different sizes. In this example, the sheet 11 is fed by a set of paper feeding rollers 12 from a paper stack 11a of the upper paper cassette 10a to the paper transport path. In a synchronized manner, the sheet 11 is fed by the registration rollers 13 to a photosensitive drum 15. At an image transfer position of the photosensitive drum 15, an image is printed on the sheet 11 which is fed along the paper transport path.

The photosensitive drum 15 is rotated by a main motor 14 in a direction indicated by an arrow in FIG. 3. The surface of the photosensitive drum 15 is electrostatically charged by a charger 16. A laser beam modulated using PWM (pulse width modulation) is emitted from the recording unit 26 to the photosensitive drum 15. It scans the surface of the photosensitive drum 15 so that an electrostatic latent image is formed there.

The developing unit 17 makes the latent image of the photosensitive drum 15 visible by using toner, and the latent image is converted into a toner image. By means of the registration rollers 13, the sheet 11 is transported to a transfer charger 18 in a synchronized manner. The toner image of the photosensitive drum 15 is transferred to the sheet 11 by the transfer charger 18. The sheet 11 is then separated from the photosensitive drum 15, and it is fed to a fixing unit 20 by means of a transport belt 19. The fixing unit 20 has a pressure roller 20a and a heating roller 20b. At the fixing unit 20, the toner image is fixed to the sheet 11 due to the pressure of the pressure roller 20b applied to the sheet 11 and due to the heat of the heating roller 20 applied to the sheet 11.

The sheet 11 is fed by ejection rollers 21 to a paper ejection tray 22. The paper ejection tray 22 is provided at a side portion of the laser beam printer 2. Meanwhile, residual toner on the photosensitive drum 15 is removed by a cleaning unit 23 from the surface of the photosensitive drum 15.

At an upper portion of the laser beam printer 2, located above the recording unit 26, there are provided several printed circuit boards 24. The controller 3, the engine driver 4, and the internal interface 6 as described above are accommodated in the printed circuit boards 24.

Figure 4:
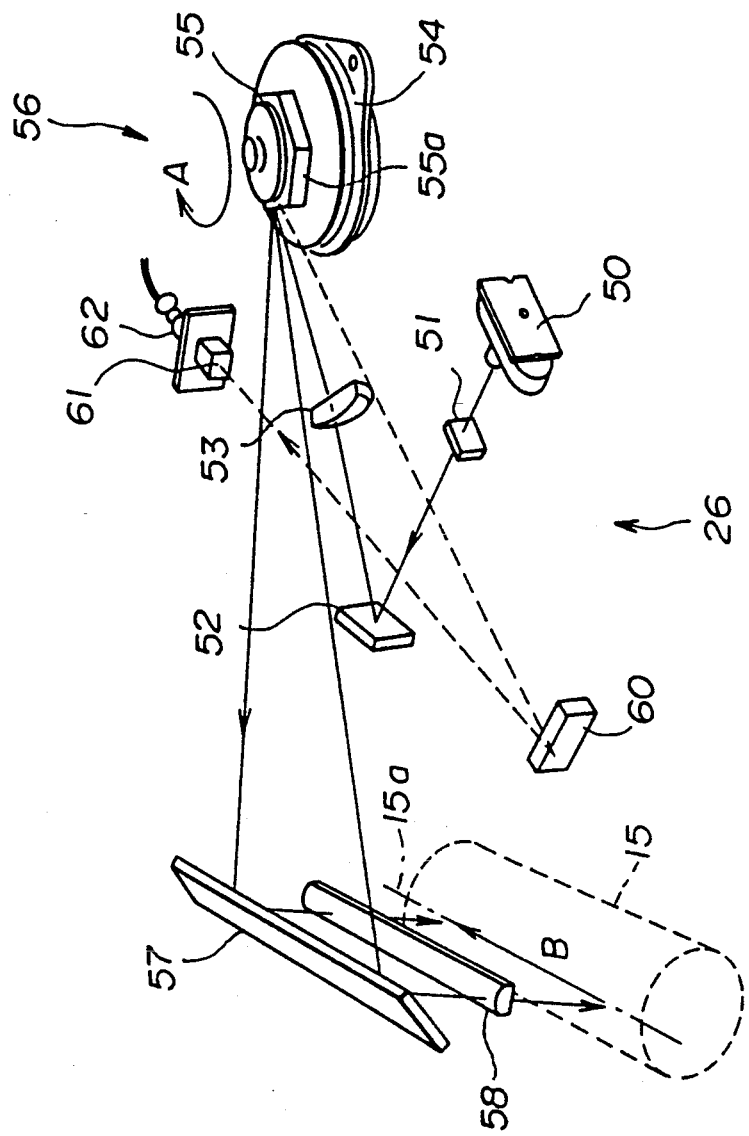
FIG. 4 is a perspective view showing a recording unit of the image forming system shown in FIG. 2.

FIG. 4 shows the construction of the recording unit 26 shown in FIG. 3. As described above, the recording unit 26 is provided in the printer engine 5 of the laser beam printer 2 shown in FIG. 2. The recording unit 26, shown in FIG. 4, generally has a laser diode (LD) unit 50, a first cylindrical lens 51, a first mirror 52, a focusing lens 53, a rotary deflector 56 (having a disk motor 54 and a polygonal mirror 55), a second mirror 57, a second cylindrical lens 58, a third mirror 60, a second focusing lens 61 (having a cylindrical lens), and a sync sensor 62 (having a light receiving element).

The LD unit 50 is a laser diode combined with a collimating lens. The laser diode is a light source for emitting laser light. This light diverges, and the collimating lens converts this diverging light into a collimated beam.

The function of the first cylindrical lens 51 is to correct the collimated light, emitted from the LD unit 50 on the photosensitive drum 15 in a sub scanning direction. The focusing lens 53 converts the collimated light reflected by the first mirror 52 into converging light, and this converging light is projected to the polygonal mirror 55.

The polygonal mirror 55 has a number of mirror surfaces 55a. Each mirror surface of the polygonal mirror 55 is curved so as to cause the light to converge. The rotary deflector 56 is a post-object type deflector which uses no lens between the deflector and the second mirror 57. The second mirror 57 reflects a light beam deflected by the rotary deflector 56 to the photosensitive drum 15, and this reflected light becomes a scanning beam to scan the surface of the photosensitive drum 15. The scanning beam reflected by the second mirror 57 is passed through the second cylindrical lens 58 so that the scanning beam forms a sharp spot on the photosensitive drum 15 along a main scanning line 15a on the photosensitive drum 15.

The third mirror 60 is placed outside the scanning region of the light beam reflected by the rotary deflector 56 over the photosensitive drum 15. The third mirror 60 receives light reflected by the rotary deflector 56, and directs the received light to the sync sensor 62. The light beam from the third mirror 60 is passed through the focusing lens 61 so that a converging light beam is directed to the sync sensor 62. The sync sensor 62 has a photoelectric conversion element such as a photodiode. The light beam arriving at the sync sensor 62 is converted into an electric signal by the photodiode, and this signal is used as a sync signal to start each main scanning line at the same position on the photosensitive drum 15.

Figure 5:
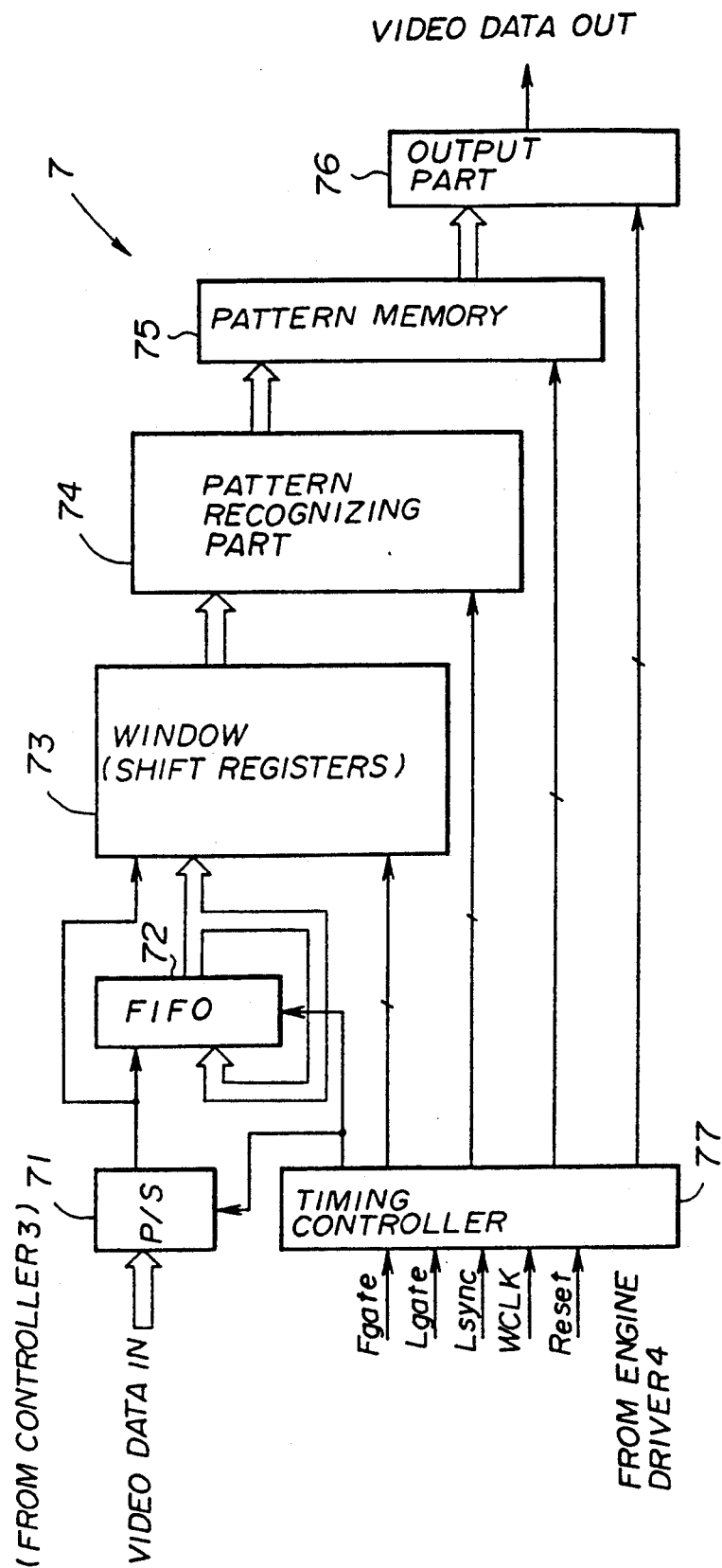
FIG. 5 is a block diagram showing a dot corrector in which a FIFO memory, a window, and a pattern recognition part shown in FIG. 1 are provided.
Figure 6:
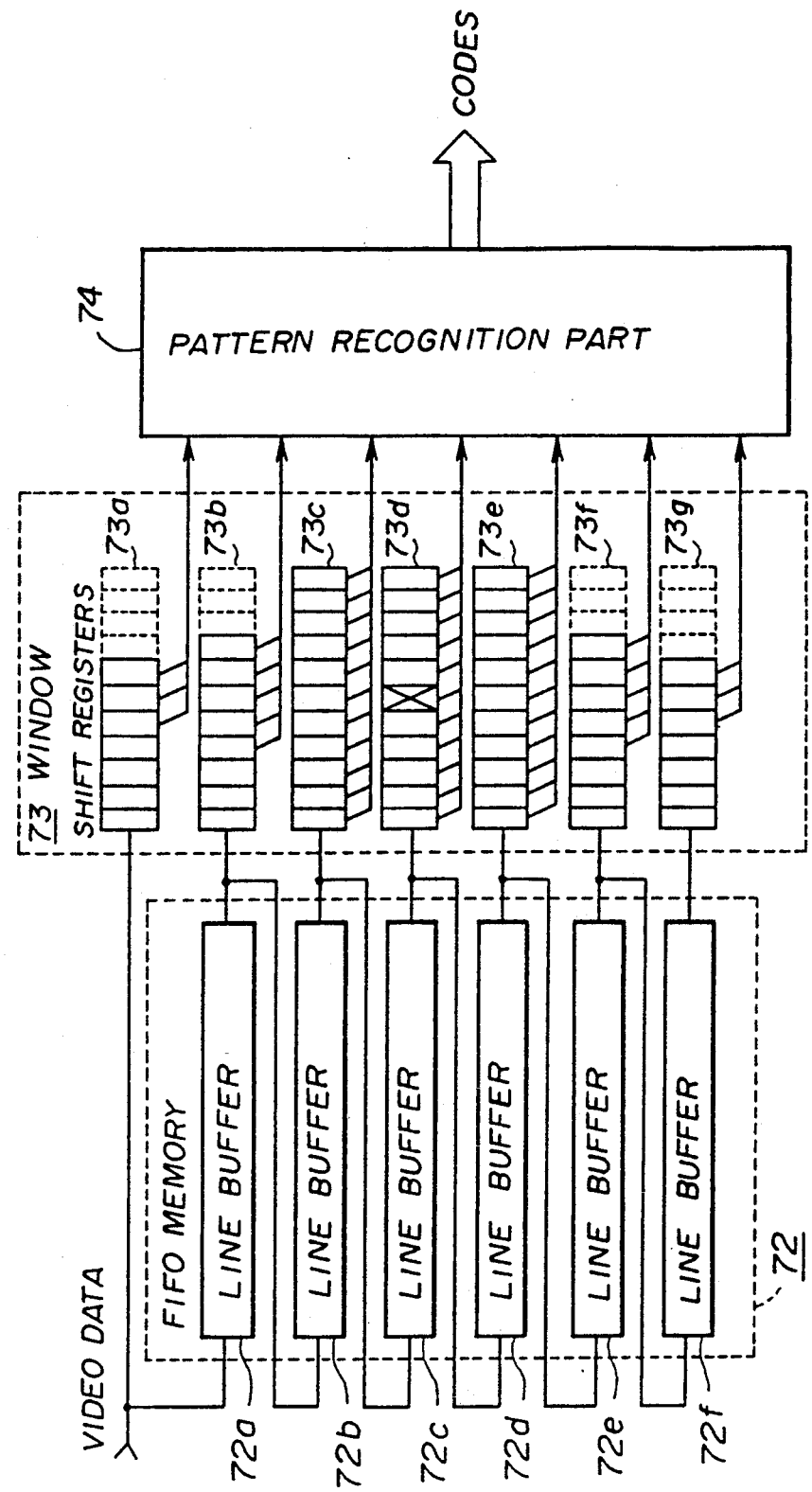
FIG. 6 is a diagram for explaining the relationship between the FIFO memory, the window and the pattern recognition part provided in the dot corrector shown in FIG. 5.

FIG. 5 shows the dot corrector 7 which is provided in the interface 6 of the laser printer 2 as shown in FIG. 2. FIG. 6 shows an essential part of the dot corrector 7 shown in FIG. 5. The dot corrector 7, shown in FIG. 5, includes a parallel-to-serial converter (P/S) 71, a FIFO memory 72, a window 73, a pattern recognition part 74, a pattern memory 75, an output part 76, and a timing controller 77.

When the image data transferred from the controller 3 shown in FIG. 2 is parallel data (e.g., 8 bits), the P/S converter 71 converts the parallel data into serial data (1 bit), and this serial data is supplied to the FIFO memory 72. When the image data transferred from the controller 3 is serial data, no P/S converter is needed in the dot corrector. The P/S converter 71 is not directly related to the dot correction according to the present invention.

The FIFO memory 72 is made up of a plurality of line buffers which are connected in series as shown in FIG. 6. In this example, six line buffers 72a through 72f are connected in series to form the FIFO (first-in first-out) memory 72, and image data from the controller 3 corresponding to six lines of the input image is stored in the line buffers of the FIFO memory 72 at one time.

The window 73 is made up of a plurality of shift registers connected in series, as shown in FIG. 6. The window 73 is provided for detecting a selected pattern of dots of the input image data. One of the shift registers at the top of the window 73 is connected to receive one line of serial image data from the P/S converter 71, and the remaining shift registers are respectively connected to the line buffers of the memory 72. In the example shown in FIG. 6, the window 73 is made up of seven 11-bit shift registers 73a through 73g. The shift register 73a of the window 73 is connected to receive one line of the image data from the controller 3, and the remaining shift registers 73b through 73g are connected to the line buffers 72a through 72f to receive six lines of the image data from the FIFO memory 72. FIG. 7 shows a 3×3 core region 73C of the window 73.

The target dot of the input image is stored at the center bit position of the 11-bit shift register 73d provided in the middle of the window 73, which position is indicated by a cross mark "X" in FIG. 6. In the example of the window 73 shown in FIGS. 6 and 7, only seven bit positions are used in each of the shift registers 73a and 73g, only eight bit positions are used in each of the shift registers 73b add 73f, and the eleven bit positions are fully used in each of the shift registers 73c through 73e. In FIG. 6, necessary bit positions of each of the shift registers are indicated by a solid line, and unused bit positions thereof are indicated by a dotted line.

By shifting one bit of the image data in the FIFO memory 72 and the widow 73, one target dot of the image data is sequentially changed to another one. Each subset of 7×11 dots having the target dot at a position corresponding to the center position of the window 73 can be taken or extracted from the image data stored in the shift registers 73a through 73g of the window 73.

In accordance with the target and neighboring dot data from the sampled image data of the window 73, the pattern recognition part 74 recognizes features of a line segment at boundaries between black dots and white dots of the input image. The pattern recognition part 74 produces a sequence of coded data in a specified format from the result of the pattern recognition. The coded data of the pattern recognition part 74 is used as an address signal to read predetermined correction data corresponding to the target dot from the pattern memory 75. The relationship between the window 73 and the pattern recognition part 74 will be described later.

The predetermined correction data read from the pattern memory 75 is sent to the output part 76. This correction data is parallel data supplied to the output part 76, and is used to correct a dot pattern of an output image at the recording unit 26 by controlling laser beam from the laser diode of the recording unit 26. The correction data is a value indicating the number of time divisions corresponding to one dot of the input image into which the standard time of laser ON is equally divided.

The output part 76, shown in FIG. 5, converts the parallel coded data from the pattern memory 75 into serial data, and sends this serial data to the printer engine 5 via the I/O unit 44 of the engine driver 4. In accordance with the serial data, the laser diode 50 of the recording unit 26 is turned ON and OFF, and the time during which the laser diode 50 is continuously ON is controlled.

The timing controller 77, shown in FIG. 5, receives several sync signals from the engine driver 4, and sends necessary sync signals to the parts 71 through 76 so as to synchronize the operations of the respective parts 71 through 76. The sync signals received at the timing controller 77 include an FGATE signal to indicate a recording time period for one page at the recording unit 26, an LGATE signal to indicate a recording time period for one line, an LSYNC signal to indicate start and end times of recording one line, a WCLK signal used to synchronize read and write times for one dot, and a RESET signal.

In the above described embodiment, it is possible that the correction data can be selectively loaded from the ROM 32 by the MPU 31 or from the ROM 42 by the CPU 41, instead of being output from the pattern memory 75. It is also possible that the correction data can be downloaded by the host computer 1 instead of being output from the pattern memory 75. The correction data produced in such a manner can be easily changed in accordance with the content of the input image.

Figure 1:
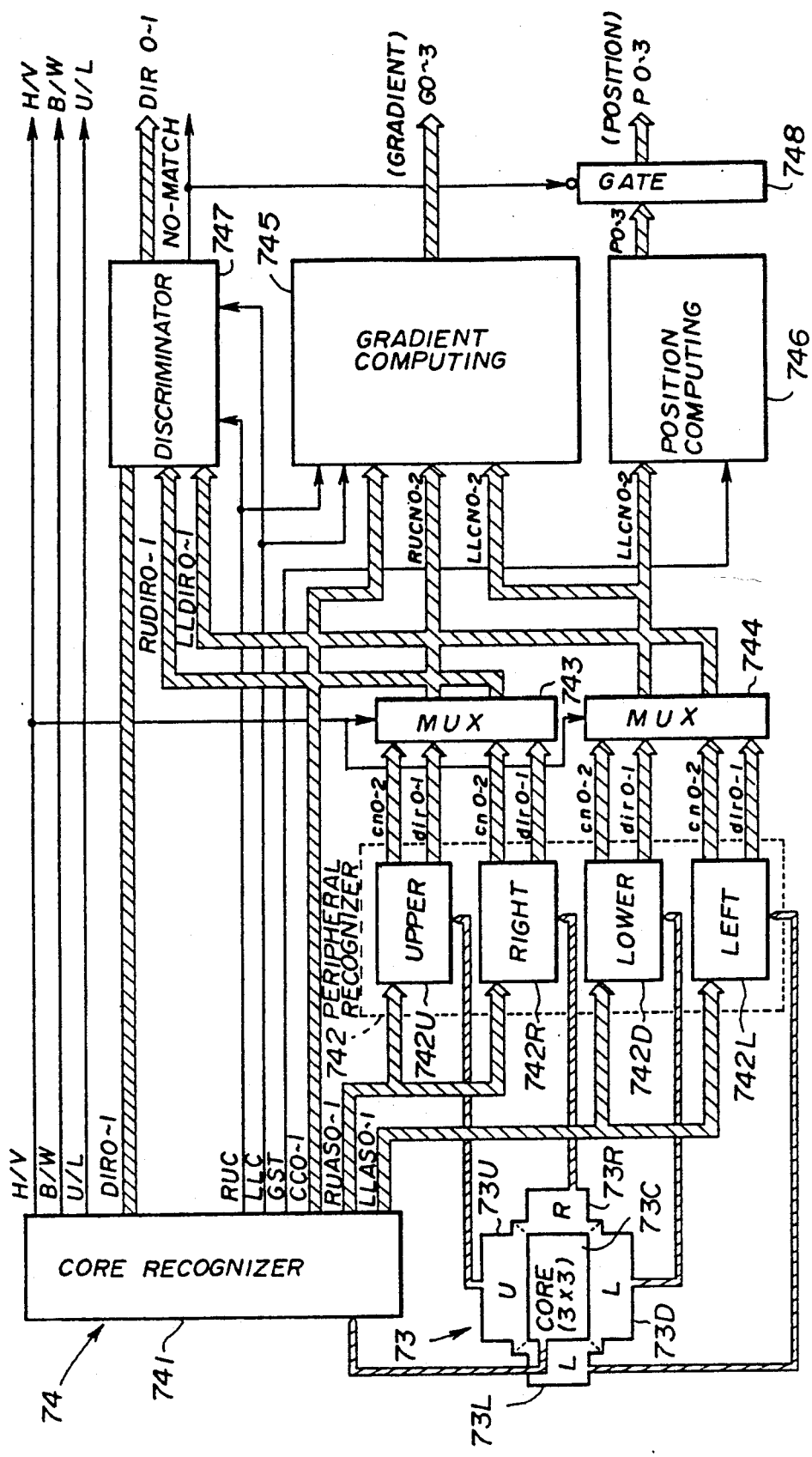
FIG. 1 is a block diagram showing an essential part of an image processing apparatus according to the present invention.

FIG. 1 shows the relationship between the window 73 and the pattern recognition part 74. The window 73 shown in FIG. 1 is divided into five different regions including the 3×3 core region 73C shown in FIG. 7, an upper region 73U, a lower region 73D, a left-hand region 73L, and a right-hand region 73R. The pattern recognition part 74 includes a core recognizing part 741 connected to the core region 73C, and a peripheral recognizing part 742 having an upper peripheral portion 742U connected to the upper region 73U, a right-hand peripheral portion 742R connected to the right-hand region 73R, a lower peripheral portion 742D connected to the lower region 73D, and a left-hand peripheral portion 742L connected to the left-hand region 73L. The pattern recognizing part 74 further includes two multiplexers MUX 743 and MUX 744, a gradient computing portion 745, a position computing portion 746, a discriminator 747, and a gate portion 748. A detailed description will be given later, with reference to FIGS. 7 through 10, of the relationship between the window 73 and the pattern recognition part 74.

(1) Window 73

The window 73 of the above embodiment is made up of seven 11-bit shift registers 73a through 73g as shown in FIG. 6. The window 73 is a sampling part for sampling a pattern of 7×11 dots from the input image, as indicated by the dotted line in FIG. 7. Each line of the input image is temporarily stored in one of the shift registers 73a through 73g. Of the dots of the input image obtained from the shift registers 73a through 73g, forty nine dots surrounded by the dotted line in FIG. 7 are used in this embodiment to detect whether a dot pattern of the input image accords with specific patterns such as a nearly vertical line or a nearly horizontal line.

(2) Core Recognizing Part 741

The core region 73C is a central portion of the window 73 having 3×3 dots surrounded by the solid lines shown in FIG. 7. The target dot which is corrected by the dot correction of the present invention when correspondence occurs in the pattern matching is the central dot of the nine dots included in the core region 73C. FIGS. 8 through 10 show sets of predetermined matching patterns of 3×3 dots for recognizing a specific configuration of a one-dot width line. In the pattern matching, it is detected whether or not the pattern of nine dots in the core region 73C (having the target dot at the center thereof) accords with one of the matching patterns. In these drawings, a black shaded circle indicates a black dot, a hollow double circle indicates a white dot, and a hollow triangle indicates a dot which does not matter in the pattern recognition.

FIGS. 8A through 8D show predetermined matching patterns of 3×3 dots used for recognizing a 45-deg one-dot width line. If a 45-deg line having a gradient equal to 1.0 (=1/1) is detected with these matching patterns, dot correction is not performed for the target dot. If a nearly horizontal line having a gradient equal to or smaller than 0.5 (=½) is detected, or if a nearly vertical line having a gradient equal to or greater than 2.0 (=2/1), it is detected that a jagged edge may appear in the image.

The detections of a nearly horizontal line and of a nearly vertical line can be performed in the same manner. The matching patterns used in the vertical line case are arranged by rotating the matching patterns used in the horizontal line case by 90 degrees.

FIGS. 9A through 9G show a set of predetermined matching patterns of 3×3 dots for recognizing a nearly horizontal one-dot width line. If the pattern of nine dots in the core region 73C accords with one of the matching patterns shown in FIGS. 9A through 9G, it is detected that the dot pattern is part of a nearly horizontal one-dot width line having a gradient equal to or smaller than 0.5 (=½).

FIGS. 10A through 10G show predetermined matching patterns of 3×3 dots for recognizing a nearly vertical one-dot width line. If the pattern of nine dots in the core region 73C accords with one of the matching patterns shown in FIGS. 10A through 10G, it is detected that the dot pattern is part of a nearly vertical one-dot width line having a gradient equal to or greater than 2.0 (=2/1).

The core recognizing part 741 performs the above described pattern recognition with the predetermined matching patterns. Thus, it can be detected whether or not the target dot of the dot pattern be corrected by the dot correction. If the dot pattern accords with one of the matching patterns shown in FIGS. 9A–9G and 10A–10G, the target dot is part of a nearly horizontal line or a nearly vertical line, and it is detected that the target dot should be corrected so as to eliminate a jagged edge. If the dot pattern accords with one of the matching patterns shown in FIGS. 8A–8D, the target dot is part of a 45-deg line, and it is detected that the target dot should not be corrected.

(3) Peripheral Recognizing Part 742

In order to correctly detect whether or not the target dot is part of a nearly horizontal or vertical line, it is necessary to check not only dots appearing in the core region 73C, but also dots appearing in some of the peripheral regions 73U, 73L, 73R and 73D.

FIGS. 11A through 11D show sets of dots appearing in such regions of the window 73 to be checked by the peripheral recognizing part 742. A set of dots in the right-hand region 73R to be checked is indicated by the solid line in FIG. 11A, a pattern of dots in the left-hand region 73L to be checked is indicated by a solid line in FIG. 11B, a set of dots in the upper region 73U to be checked is indicated by a solid line in FIG. 11C, and a set of dots in the lower region 73D to be checked is indicated by a solid line in FIG. 11D. In the above described embodiment, two dots at the ends of each of the peripheral regions overlap with those of the adjacent peripheral region.

Figure 12A:
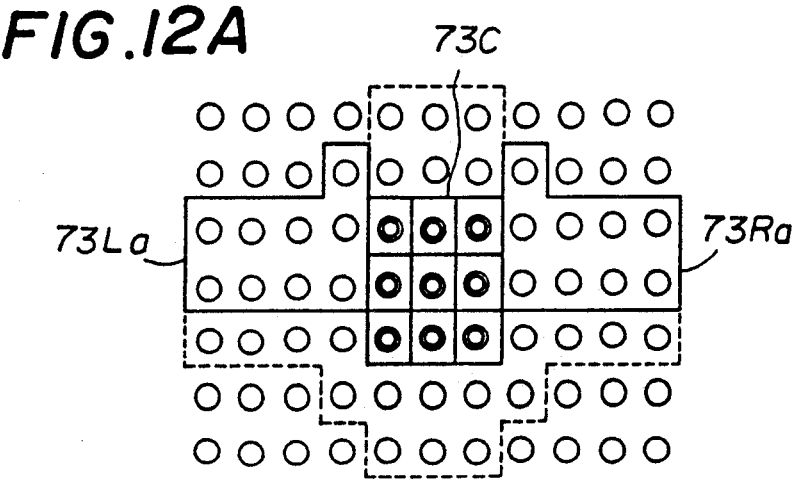
FIGS. 12A through 12C are diagrams showing three sub-regions of each of the left-hand and right-hand regions of the window shown in FIG. 7.
Figure 12B:
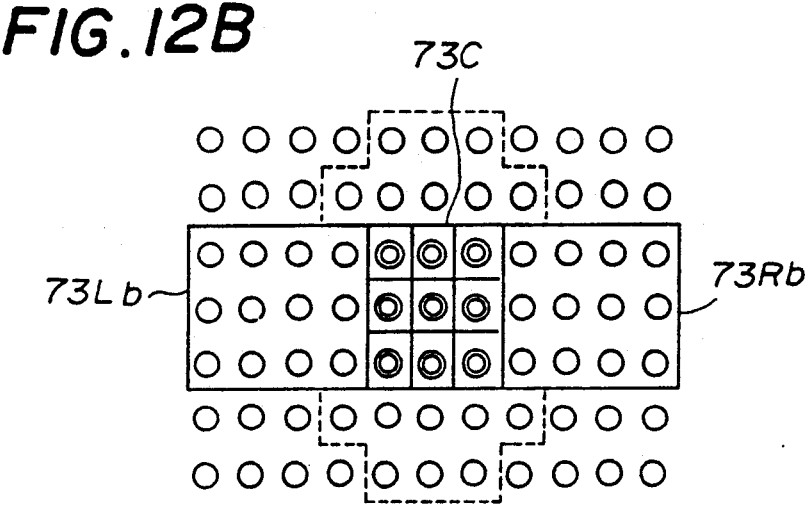
Figure 12C:
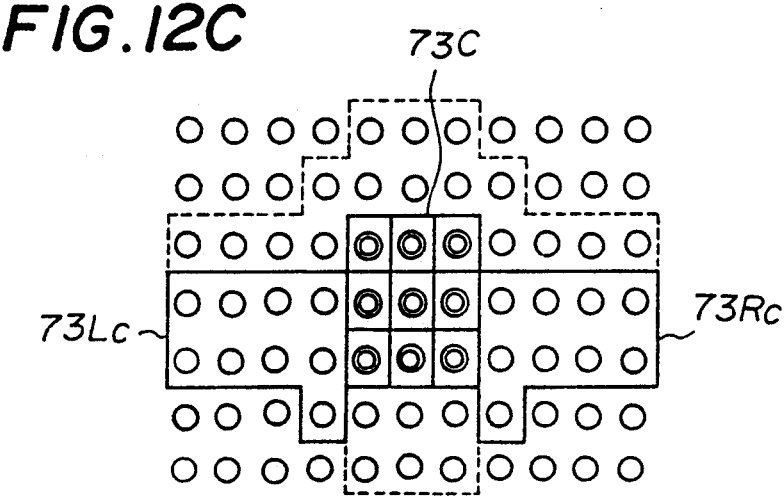
Figure 13A:
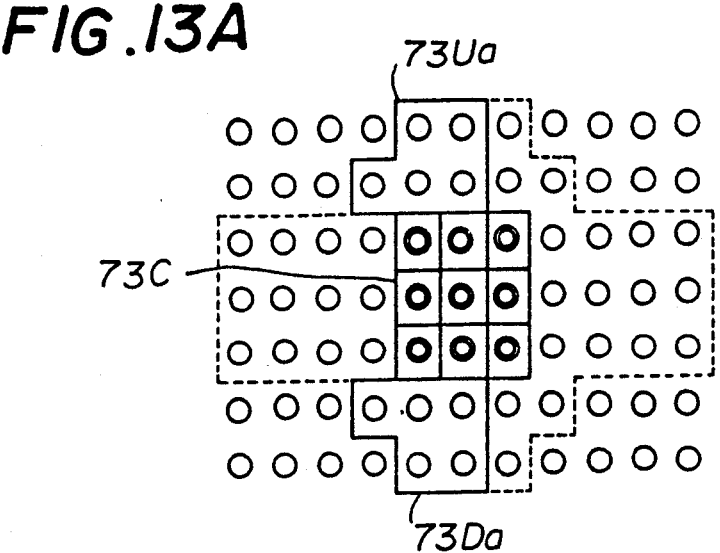
FIGS. 13A through 13C are diagrams showing three sub-regions of each of the upper and lower regions of the window shown in FIG. 7.
Figure 13B:
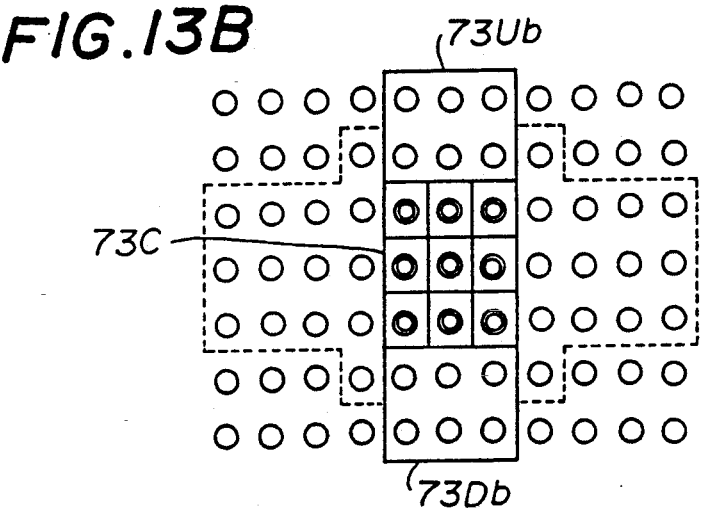
Figure 13C:
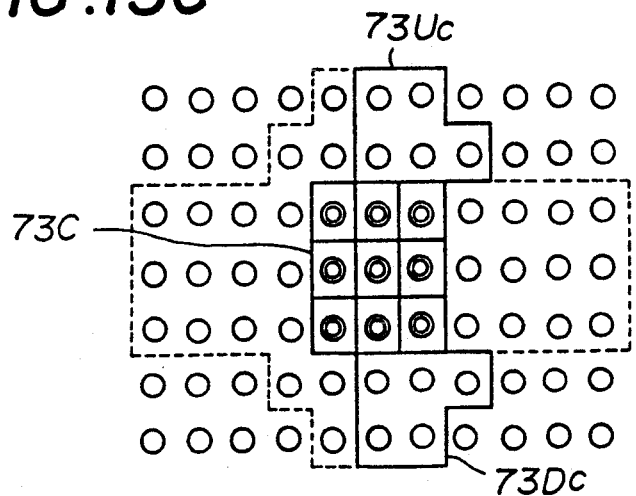

Each of the peripheral regions 73R, 73L, 73U and 73D of the window 73 is further divided into three sub-regions, for the sake of convenience. The left-hand region 73L is divided into sub-regions 73La, 73Lb and 73Lc as shown in FIGS. 12A through 12C. The right-hand region 73R is divided into sub-regions 73Ra, 73Rb and 73Rc as shown in FIGS. 12A through 12C. The upper region 73U is divided into sub-regions 73Ua, 73Ub and 73Uc as shown in FIGS. 13A through 13C. The lower region 73D is divided into sub-regions 73Da, 73Db and 73Dc as shown in FIGS. 13A through 13C.

At the peripheral recognizing part 742, it is judged what sub-regions are selected to check the dots therein, depending on the state of the line described by black dots in the core region 73C. More specifically, when a nearly horizontal line having a gradient $\leq 0.5$ is detected with the black dots in the core region 73C, either of the right-hand region 73R shown in FIG. 11A and the left-hand region 73L shown in FIG. 11B or both thereof is selected by the peripheral recognizing part 742. When a nearly vertical line having a gradient $\geq 2.0$ is detected with the black dots in the core region 73C, either of the upper region 73U shown in FIG. 11C and the lower region 73D shown in FIG. 11D or both thereof is selected.

Figure 14:
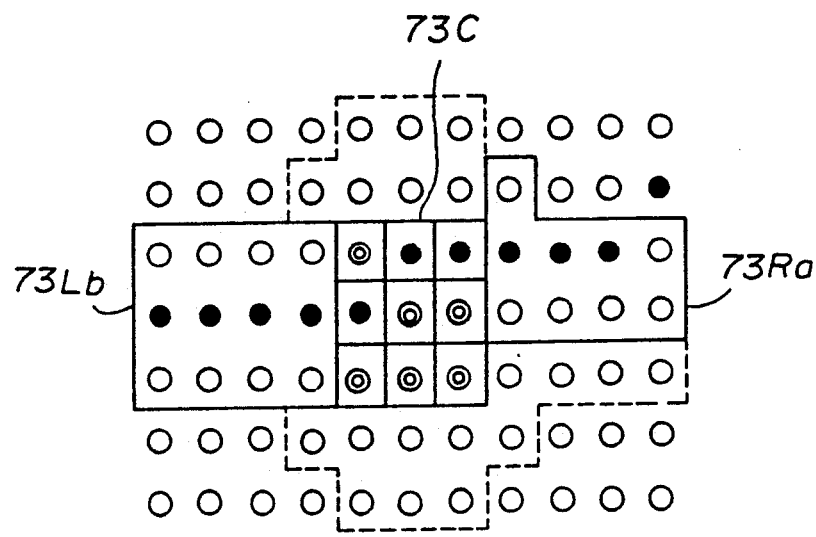
FIG. 14 is a diagram for explaining a sub-region selection when a nearly horizontal line is detected in the window.
Figure 15:
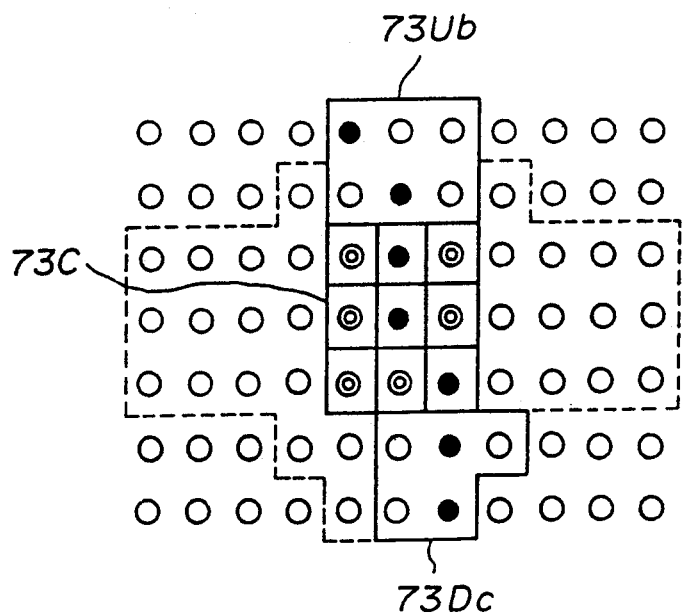
FIG. 15 is a diagram for explaining a sub-region selection when a nearly vertical line is detected in the window.

When the dot pattern of a nearly horizontal line shown in FIG. 14 is detected with the black dots in the core region 73C, the left-hand sub-region 73Lb and the right-hand sub-region 73Ra are selected. When the dot pattern of a nearly vertical line shown in FIG. 15 is detected with the black dots in the core region 73C, the upper sub-region 73Ub and the lower sub-region 73Dc are selected. However, in the case of the line shown in FIG. 14, it is possible to select only the right-hand region 73R by modification. Also, in the case of the line shown in FIG. 15, it is possible to select only the upper region 73U by modification.

Next, a description will be given, with reference to FIG. 1, of signals produced at outputs of several portions of the pattern recognition part 74 of the image processing apparatus of the present invention.

(1) Core Recognizing Part 741

H/V: a signal indicating whether a line in the core region 73C is nearly horizontal or vertical. H/V has a high value "1" if a nearly horizontal line is detected, and has a low value "0" if a nearly vertical line is detected.

DIR0-1: signals (2 bits) indicating the value of a direction factor of gradient of a line in the core region 73C, as follows.

| DIR0 | DIR1 | |
| --- | --- | --- |
| 0 | 0 | No match (correction not needed) |
| 0 | 1 | left-hand down and right-hand up (ascending) |
| 1 | 0 | left-hand up and right-hand down (descending) |
| 1 | 1 | Horizontal or vertical |

B/W: a signal indicating whether the target dot is black or white. B/W has a high value "1" if the target dot is a black dot, and has a low value "0" if the target dot is a white dot.

U/L: a signal indicating location of the target dot relative to the line described by black dots when the target dot is white. U/L has a high value "1" when the target dot is located above (or to the right of) the line, and has a low value "0" when the dot is located below (or to the left of) the line.

GST: a signal indicating whether or not the target dot s the starting point of the gradient of an inclined line (the source of a distortion). GST has a high value "1" if the target dot is the starting point, and has a low value "0" if it is not.

RUC: a signal indicating whether or not it is necessary to check the dot pattern of the right-hand region 73R or the upper region 73U in addition to the checking of the core region 73C. RUC has a high value "1" if it is necessary, and has a low value "0" if not.

LLC: a signal indicating whether or not it is necessary to check the dot pattern of the left-hand region 73L or the lower region 73D in addition to the checking of the core region 73C. LLC has a high value "1" if it is necessary, and has a low value "0" if not. When both RUC and LLC have the high value "1", the dot pattern of the core region 73C is a horizontal or vertical line. When both RUC and LLC have the low value "0", the pattern matching for the peripheral region is not necessary.

CC0-1: signals (2 bits) indicating the number of successive black dots indicating a line in the core region 73C, the value of CC0-1 ranging from 0 to 3.

RUAS0-1: signals (2 bits) indicating what region should be selected from the three sub-regions of the right-hand region 73R or the upper region 73U.

LLAS0-1: signals (2 bits) indicating what region should be selected from the three sub-regions of the left-hand region 73L or the lower region 73D.

(2) Peripheral Recognizing Part 742 cn0-2: signals (3 bits) indicating the number of successive black dots indicating a vertical or horizontal line in the peripheral regions, the value of cn0-2 ranging from 0 to 4.

dir0-1: signals (2 bits) indicating the value of the direction factor of the gradient of a line in the peripheral regions (the sub-regions), similar to the DIR0-1 at the above core recognizing part 741.

(3)- Multiplexers (MUX) 743 and 744

RUCN0-2: signals (3 bits) indicating the number of successive black dots of the line in the right-hand region 73R or the upper region 73U.

RUDIR0-1: signals (2 bits) indicating the value of the gradient direction factor of the line in the the right-hand region 73R or the upper region 73U.

LLCN0-2: signals (3 bits) indicating the number of successive black dots of the line in the left-hand region 73L or the lower region 73D.

LLDIR0-1: signals (2 bits) indicating the value of the gradient direction factor of the line in the left-hand region 73L or the lower region 73D.

(4) Discriminator 747

DIR0-1: signals which are the same as the DIR0-1 at the core recognizing part 741.

NO-MATCH: a signal indicating whether or not the target dot of the recognized dot pattern should be corrected. NO-MATCH has a high value "1" if the target dot of the dot pattern should not be corrected.

(5) Gradient Computing Part 745

G0-3: signals (4 bits) indicating the value of the gradient of the recognized dot pattern (or the line) being computed. The value of the gradient is the number of "n" successive black dots relative to a one-dot step of the line, which indicates the inclination ("1/n" or "n/1") of the line.

(6) Position Computing Part 746 & Gate Part 748 p0-3: signals (4 bits) indicating the position of the target dot relative to the starting point of the line. The position of the target dot is indicated by the number of successive black dots between the target dot and the left end point of a nearly horizontal line or by the number of successive black dots between the target dot and the bottom end point of a nearly vertical line.

P0-3: signals (4 bits) indicating the above relative position of the target dot output from the gate part 748. If the NO-MATCH of the discriminator 747 is "0", the output signals p0-3 of the position computing part 746 are output by the gate part 748, so that the dot correction is performed. If the NO-MATCH of the discriminator 747 "1", signals indicating "0" are output by the gate part 748.

Next, a description will be given of several component parts of the pattern recognition part 74 with reference to FIG. 1.

As shown in FIG. 1, the core recognizing portion 741 receives data of the sampled 3×3 dots from the core region 73C, and performs the above mentioned detection and computation with respect to the target dot at the center of the sampled dots. The core recognizing portion 741 outputs the signals H/V, B/W and U/L to the pattern memory 75. The core recognizing part 741 switches inputs of the multiplexers 743 and 744 depending on whether the signal H/V indicates a nearly horizontal line or a nearly vertical line.

The core recognizing portion 741 outputs the signals RUC and LLC to the gradient computing portion 745 and to the discriminator 747. Also, it outputs the signal GST to the position computing portion 746. It outputs the signals DIR0-I to the discriminator 747. It outputs the signals CC0-1 to the gradient computing portion 745. It outputs the signals RUAS0-1 to the upper peripheral portion 742U and to the right peripheral portion 742R. It outputs the signals LLAS0-1 to the lower peripheral portion 742D and to the left peripheral portion 742L.

The peripheral recognizing portion 742 receives data of the sampled dots from each of the peripheral regions 73U, 73L, 73R and 73D or from specified sub-regions thereof, and recognizes a dot pattern in some of the peripheral regions. It outputs the signals cn0-2 and the signals dir0-2 to either the multiplexer 743 or the multiplexer 744. The signals cn0-2 indicate the number of successive black dots in the specified regions. The signals dir0-2 indicate the value of the gradient direction factor of the line.

The multiplexer 743 selectively receives the signals cn0-2 and dir0-2 from the upper peripheral portion 742U when the signal H/V of the core recognizing portion 741 is "0", and when the signal H/V is "1", it selectively receives the signals cn0-2 and dir0-2 from the right-hand peripheral portion 742R. The multiplexer 743 then outputs the signals RUCN0-2 to the gradient computing portion 745, and it also outputs the signals RUDIR0-1 to the discriminator 747.

The multiplexer 744 selectively receives the signals cn0-2 and dir0-2 from the lower peripheral portion 742D when the signal H/V of the core recognizing portion 741 is "0", and when the signal H/V is "1", it selectively receives the signals cn0-2 and dir0-2 from the left-hand peripheral portion 742L. The multiplexer 744 outputs the signals LLCN0-2 to the gradient computing portion 745, and it also outputs the signals LLDIR0-1 to the discriminator 747.

The discriminator 747 receives the signals DIR0-1, RUDIR0-1, LLDIR0-1, RUC and LLC, and it detects whether or not it is necessary to correct the target dot of the dot pattern of the input image. When it is detected that the correction of the target dot is necessary, the discriminator 747 outputs the signals DIR0-1 to the pattern memory 75, and it outputs the signal NO-MATCH having the value "1". This signal NO-MATCH with the value "1" allows the gate part 748 to be placed in a closed state, so that the position signals P0-3 of the position computing portion 746 are not output via the gate part 748.

In accordance with the signals CC0-1 indicating the number of successive black dots of the line, and the signals RUCN0-2, LLCN0-2, RUC and LLC having been received, the gradient computing portion 745 computes the gradient of the line from the received signals in accordance with the following formula.

$$Gradient = CC + (RUC \times RUCN) + (LLC \times LLCN) \quad (1)$$

The gradient computing portion 745 outputs the signals G0-3 indicating the value of the computed gradient of the line. This value of the computed gradient shows the number of successive black dots of the line.

The position computing portion 746 receives the signals LLCN0-2 indicating the number of successive black dots of a line in the window (the left-hand region 73L or the lower region 73D), and receives the signal GST indicating whether or not the target dot is the starting point of the linewith the gradient. In accordance with the received signals LLCN0-2 and GST, the position computing portion 746 computes the position of the target dot relative to the starting point of the line in accordance with the following formula.

$$Position = GST + (1 - GST) \times (LLCN + 2) \quad (2)$$

The position computing portion 746 outputs the signals p0-3 indicating the value of the calculated position of the target dot.

Some examples of computations of the gradient by the gradient computing portion 745 and of the position by the position computing portion 746 will now be described with reference to FIGS. 16 through 18. In these drawings, each target dot is a dot located at line "d" and column "6" of the window in which 7×11 dots are sampled from an input image.

Figure 16:
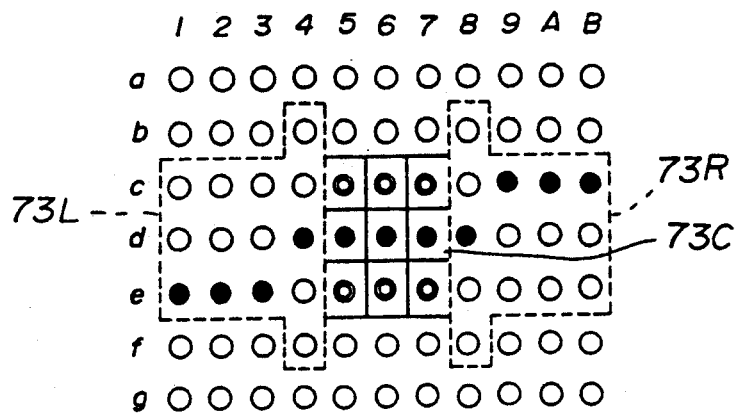
FIGS. 16 through 18 are diagrams showing examples of dot patterns in the window when a target dot is shifted one by one, which are subjected to the dot correction.

(1) Example of FIG. 16

An example in which a dot pattern shown in FIG. 16 appears in the window 73 (having 7×11 dots) will be considered. The target dot in this example is not the starting point of an inclined line in the core region 73C. The number of successive black dots in the line in the core region 73C is equal to 3. It is necessary to additionally check the dots in the right-hand region 73R and the left-hand region 73L. The core recognizing portion 741 outputs the following signals.

GST=0, CC=3, RUC=1, LLC=1

The number of horizontally successive black dots in each of the left-hand region 73L and the right-hand region 73R, the dots being the continuations of the line in the core region 73C is equal to 1. Thus, the MUXs 743 and 744 output the following signals.

RUCN=1, LLCN=1

Therefore, the gradient of the line computed by the gradient computing portion 745 according to the formula (1) and the position of the target dot computed by the position computing portion 746 according to the formula (2) are as follows.

$$Gradient = 3 + (1 \times 1) + (1 \times 1) = 5$$

$$Position = 0 + (1 - 0) \times (1 + 2) = 3$$

Figure 17:
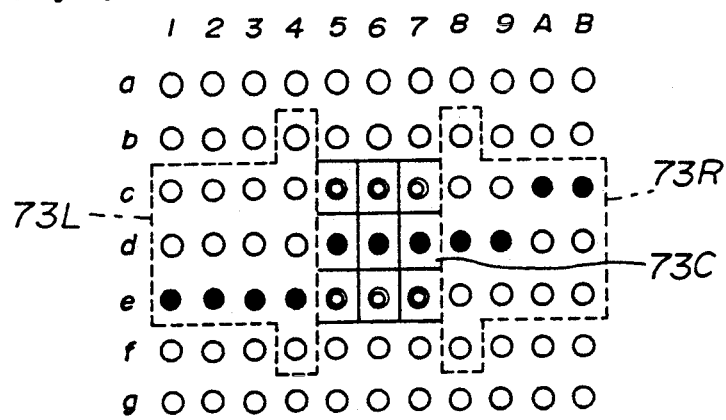

(2) Example of FIG. 17

FIG. 17 shows a dot pattern in the window 73 when the dot pattern shown in FIG. 16 is shifted one dot to the right. The output signals in this example have the values which are the same as those in the example of FIG. 16, except that the number of horizontally successive black dots of the right-hand region 73R continuous to the line of the core region 73C is increased to 2, and that the number of horizontally successive black dots of the left-hand region 73L continuous to the line of the core region 73C is reduced to 0. The MUXs 743 and 744 output the signals: RUCN=2 and LLCN=0.

Therefore, the gradient of the line and the position of the target dot are computed as follows.

$$Gradient = 3 + (1 \times 2) + (1 \times 0) = 5$$

$$Position = 0 + (1 - 0) \times (0 + 2) = 2$$

Figure 18:
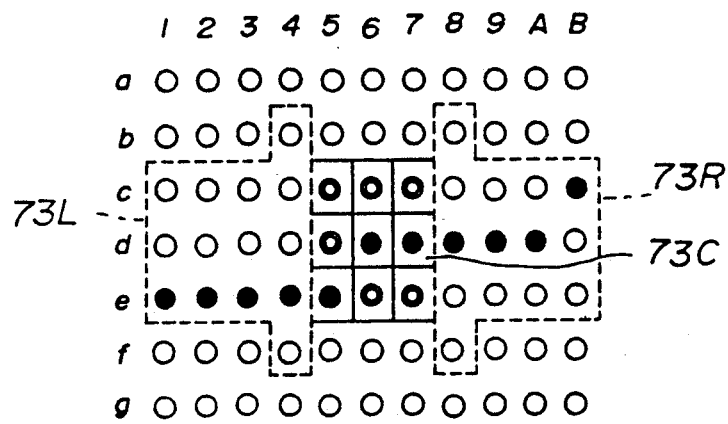

(3) Example of FIG. 18

FIG. 18 shows a dot pattern in the window 73 when the dot pattern shown in FIG. 17 is further shifted one dot to the right. The target dot in this example is the starting point of the line changed to the step in the core region 73C. The number of successive black dots of the core region 73C is equal to 2. It is needed to check additionally dots in right-hand region 73R, but it is not needed to check additionally dots in the left-hand region 73L. The core recognizing portion 741 outputs the signals: GST=1, CC=2, RUC=1, and LLC=0.

The number of horizontally successive black dots of the left-hand region 73L continuous to the line of the core region 73C is equal to 3. The number of horizontally successive black dots of the right-hand region 73R continuous to the line of the core region 73C is equal to 4. Thus, the MUX 743 and the MUX 744 output the signals RUCN=3 and LLCN=4.

Therefore, the gradient of the line computed by the gradient computing portion 745 and the position of the target dot computed by the position computing portion 746 are as follows.

$$Gradient = 2 + (1 \times 3) + (0 \times 4) = 5$$

$$Position = 1 + (1 - 1) \times (4 + 2) = 1$$

In the above described examples, the calculation of the gradient and position performed in the case of a nearly horizontal line is described. The calculation of the gradient and position in a case of a nearly vertical line can be performed in a similar manner. In the vertical line case, the signal RUCN is replaced by a signal indicating the number of successive black dots in the upper region 73U, and the signal LLCN is replaced by a signal indicating the number of successive black dots in the lower region 73D.

Next, a description will be given, with reference to FIGS. 14, 19 and 21, of the dot correction of the present invention performed with respect to a nearly horizontal line in the window shown in FIG. 14.

A dot pattern in a 7×11 video data area of the RAM 43 of the engine driver 4, corresponding to the dot pattern of the window 73 shown in FIG. 14, is shown in FIG. 19 In this drawing, a circle of a dotted line indicates input dot data transferred from the controller 3, and a shaded circle indicates output dot data after each target dot is corrected according to the present invention. By the dot correction, a pulse duration of laser ON at the recording unit 26 is changed to correct a diameter of each dot or to add a new dot to the dot pattern so that a distortion is eliminated from the image.

In the example shown in FIG. 19, the input dot data transferred from the controller 3 to the dot corrector 7 indicates a nearly horizontal line having a 1/5 gradient, which will produce a jaggy without performing the dot correction. At a lower portion of FIG. 19, a sequence of pulse durations of laser ON at the recording unit 26 after the dot correction is shown. This sequence of pulse durations corresponds to the output dot data aligned at line "d" of the video data area shown in FIG. 19.

FIG. 14 shows the dot pattern in the window 73 wherein the target dot is located at line "d", column "9" of the video data area shown in FIG. 19. The signals produced at the respective portions of the pattern recognizing part 74, in this example, have the values as indicated in FIGS. 21A through 21D with respect to the case of FIG. 14. FIG. 21A shows the values of the signals produced at the outputs of the core recognizing portion 741. FIG. 21B shows the values of the signals produced at the outputs of the peripheral recognizing portion 742. FIGS. 21C and 21D show the values of the gradient and position computed with respect to the target dot, respectively. Among the signals shown in FIGS. 21A through 21D, the signals H/V, DIR0-1, B/W, U/L, G0-3 and P0-3 are used as address signals input to the pattern memory 75 shown in FIG. 5. The output dot data as the corrected image data is read from the pattern memory 75 in accordance with the address signals of the pattern recognizing part 74. The output part 76 transfers the corrected image signal from the pattern memory 75 to the engine driver 4, with respect to each target dot. At the engine driver 4, the corrected image signal of each target dot is used as a signal to drive the light source 50 of the recording unit 26.

When the dot correction is performed with respect to each target dot of the input image according to the present invention, the pulse duration of laser ON when the dot at line "d", column "9" of the video data area shown in FIG. 19 is printed is changed to 6/10 of the full pulse duration as shown in FIG. 19. Also, according to the present invention, by detecting the condition of the surrounding regions of the target dot in the input dot data, a small dot with appropriate diameter is newly added to the dot pattern. For example, a small dot with a diameter equal to 1/10 of the full dot diameter is added to the dot pattern at a position of the dot at line "d", column "10" of the video data area shown in FIG. 19. Thus, it is possible to eliminate distortions from the image when the image is a nearly horizontal line, and the image with smooth edges can be produced through the dot correction according to the present invention.

Next, a description will be given, with reference to FIGS. 15, 20 and 21, of the dot correction performed with respect to a nearly vertical line in the window shown in FIG. 15.

A dot pattern in the 7×11 video data area of the RAM 43 of the engine driver 4, corresponding to the vertical dot pattern of the window 73 shown in FIG. 15, is shown in FIG. 20. In this drawing, a circle of a dotted line indicates input dot data transferred from the controller 3, and a shaded circle indicates output dot data after each target dot is corrected according to the present invention.

In the example shown in FIG. 20, the input dot data transferred from the controller 3 to the dot corrector 7 indicates a nearly vertical line with a gradient of 3/1, which will produce a jaggy without performing the dot correction. At a lower portion of FIG. 20, a pulse duration of laser ON at the recording unit 26 after the dot correction is shown. This pulse duration corresponds to the output dot data at line "b" of the video data area shown in FIG. 20.

FIG. 15 shows the dot pattern in the window 73 wherein the target dot is a dot at line "b", column "5" of the video data area shown in FIG. 20. The signals produced at the respective portions of the pattern recognizing part 74, in this example, have the values indicated in FIGS. 21A through 21D with respect to the case of FIG. 15. Among the signals shown in FIGS. 21A through 21D, the signals H/V, DIR0-1, B/W, U/L, G0-3 and P0-3 are used as address signals input to the pattern memory 75 shown in FIG. 5. The output dot data which is the corrected image data is read from the pattern memory 75 in accordance with the address signals of the pattern recognizing part 74. The output part 76 transfers the corrected image signal from the pattern memory 75 to the engine driver 4 with respect to each target dot. At the engine driver 4, the corrected image signal of each target dot is used as a signal to drive the light source 50 of the recording unit 26.

As the result of the dot correction according to the present invention, the phase of the laser ON pulse when the dot at line "b", column "5" of the video data area is printed is retarded by $\frac{1}{3}$ of the pulse duration as shown in FIG. 20. Thus, the dot at this position (the circle of the dotted line) of the video data area is corrected in a manner that the dot after the dot correction is printed at a position (the shaded circle) which is shifted to the right by a distance corresponding to $\frac{1}{3}$ of the dot diameter (which is the same as the pulse duration). Also, the dot at line "c", column "7" (the circle of the dotted line) of the video data area is corrected by advancing the phase of the corresponding laser ON pulse in a manner that the dot after the dot correction is printed at a position (the shaded circle) which is shifted to the left by a distance corresponding to $\frac{1}{3}$ of the dot diameter. Thus, it is possible to eliminate distortions from the image when the image is a nearly vertical line, and the image with smooth edges can be produced through the dot correction according to the present invention.

Next, a description will be given, with reference to FIGS. 22 through 31, of the dot correction of the present invention performed with respect to an actual character image.

Figure 22:
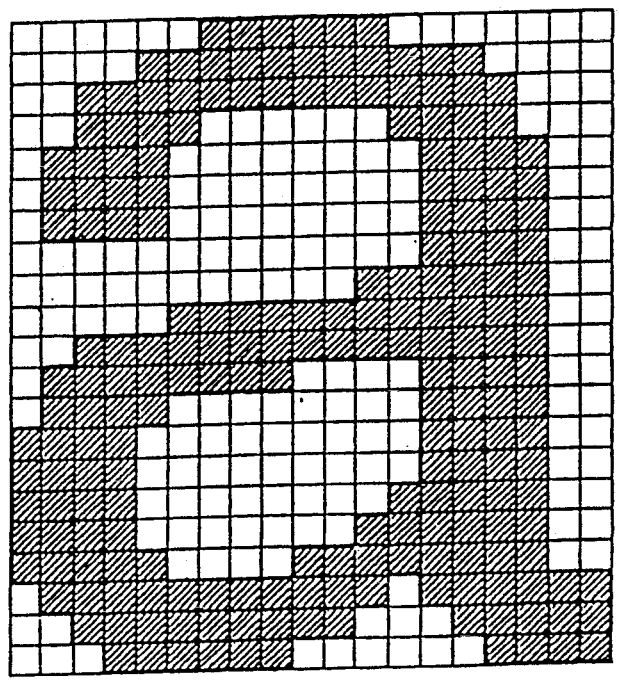
FIG. 22 is a diagram showing print data indicating a character image "a"

FIG. 22 shows print data indicating a character image "a" consisting of 21×19 dots. It is assumed, for the sake of convenience, that a corresponding bit mapped data is produced from this image and stored in the video data area of the RAM 33 of the controller 3. In the image shown in FIG. 22, a region of black dots is shaded by hatching, and a region of whits dots is not shaded.

Figure 23:
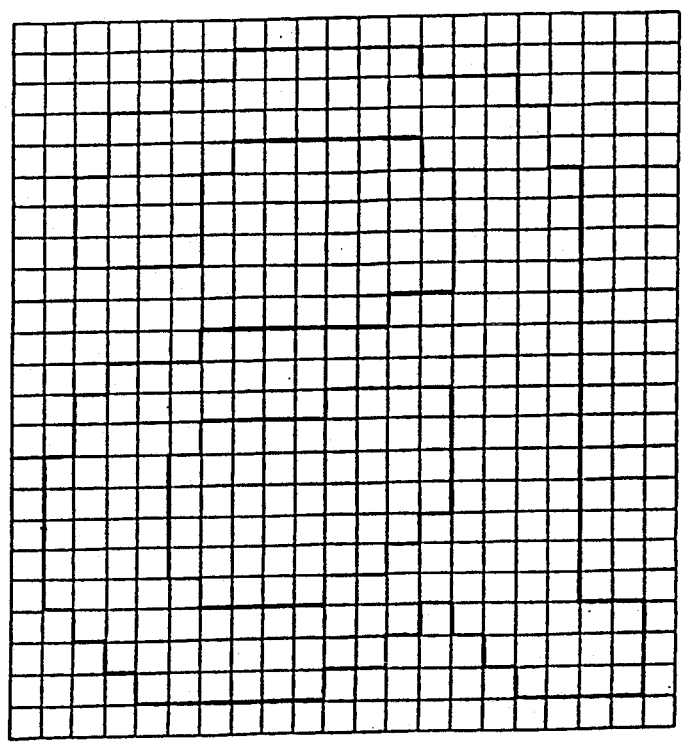

FIG. 23 shows an outline of the character image "a" shown in FIG. 22. This outline image, shown in FIG. 23, can be produced through a known edge detection. By sampling each dot from the bit mapped data transferred from the controller 3 by means of the window 73, a dot pattern at a boundary between the black dot region and the white dot region can be detected through the edge detection as being the outline image shown in FIG. 23. As shown in this drawing, several jagged edges may be produced in the character image "a" unless the dot correction is performed.

Figures 24, 25:
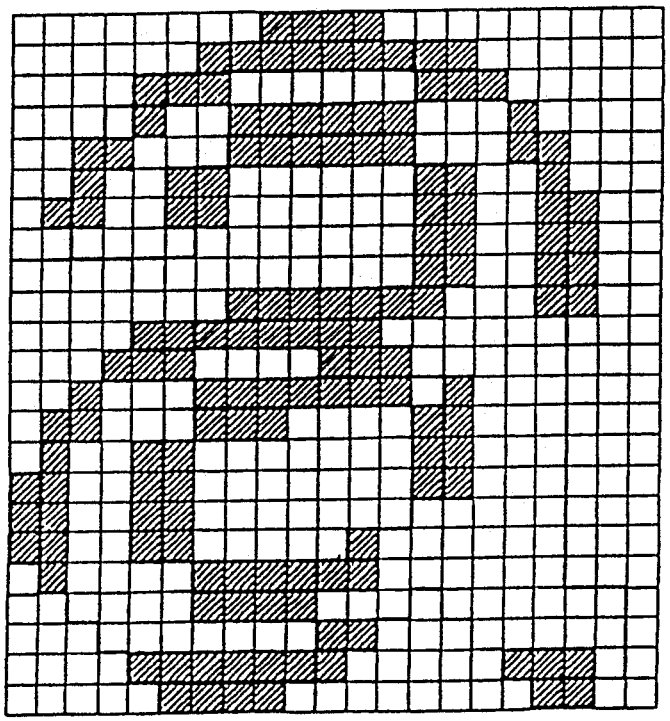

FIG. 24 shows dots in the character image of FIG. 22 which should be corrected by the dot correction according to the present invention in order to eliminate distortions from the image and to smooth edges of the image. In FIG. 24, the dots which should be corrected are the dots being shaded by hatching. These dots are detected as being part of a nearly horizontal line or a nearly vertical line obtained from the outline image of FIG. 23.

FIG. 25 shows a simulation result of the pattern recognition regarding the signal H/V which has been performed with respect to each target dot of the character image "a". The simulation result which is given for the sake of convenience may differ from the actual result. In this drawing, a mark "V" indicates the target dot which is part of a nearly horizontal or vertical line having a certain gradient, and the dots without the mark are not part of such an inclined line. FIG. 26 shows a simulation result of the pattern recognition regarding the signals DIRO-1 which has been performed for each target dot of the character image "a". In this drawing, a numeral letter of each target dot indicates the value of the direction factor of the signals DIR0-1 (the value ranging from 0 to 2) output from the dot corrector 7 shown in FIG. 1.

Figures 28, 29:
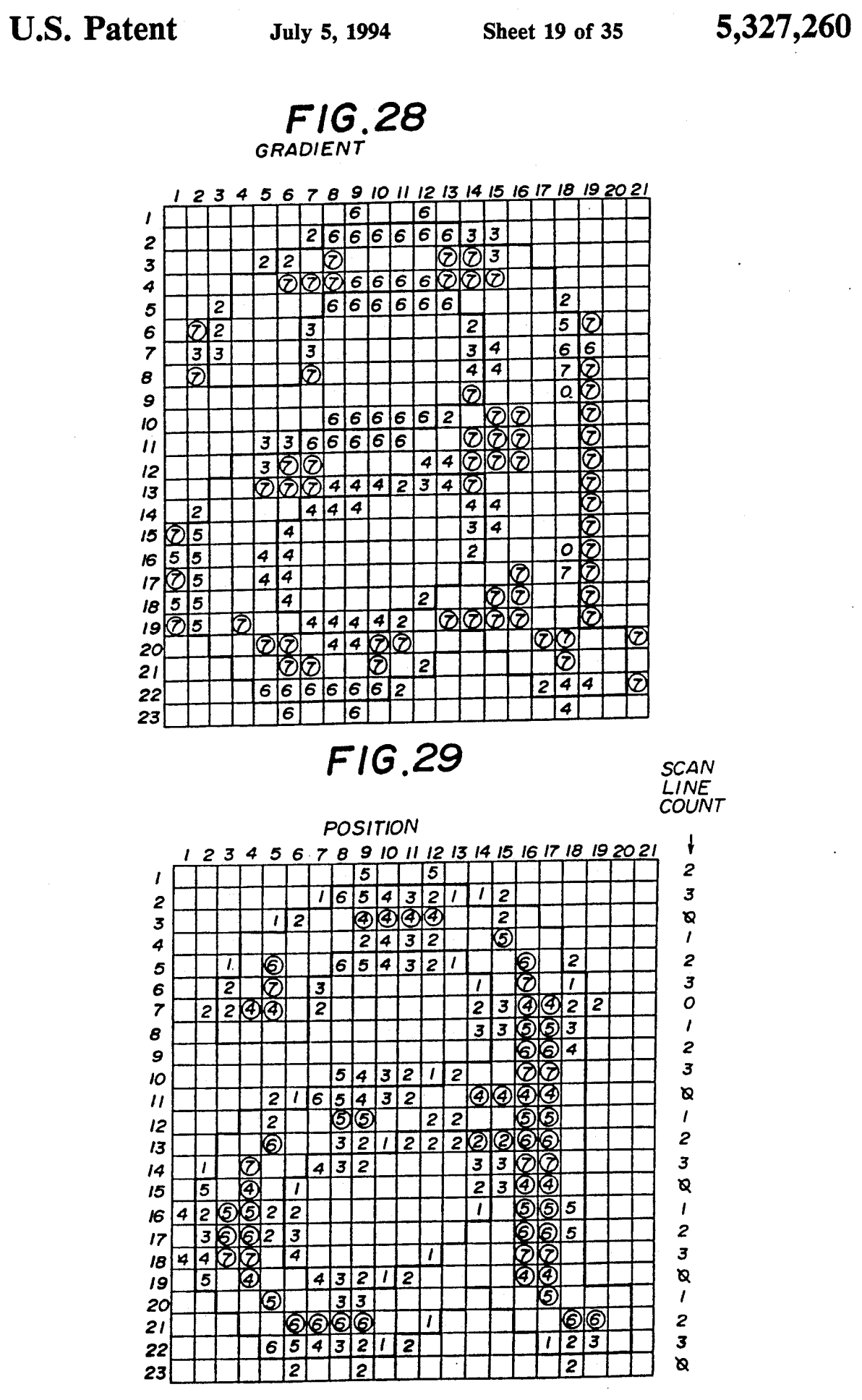

FIG. 27 show a simulation result of the pattern recognition regarding the signal U/L which has been performed with respect to each target dot of the character image "a". In this drawing, a mark "U indicates a location of each target dot relative to a line (described by black dots) adjacent to the target dot, and dot with no this mark is not such a target dot. FIG. 28 shows a simulation result of the gradient computation performed with respect to each target dot of the character image "a", which dot is part of a nearly horizontal or vertical line having one-dot width). In this drawing, a numeral letter of each target dot indicates the value of the computed gradient of the line. This gradient is the number of successive black dots of the line.

Figure 30:
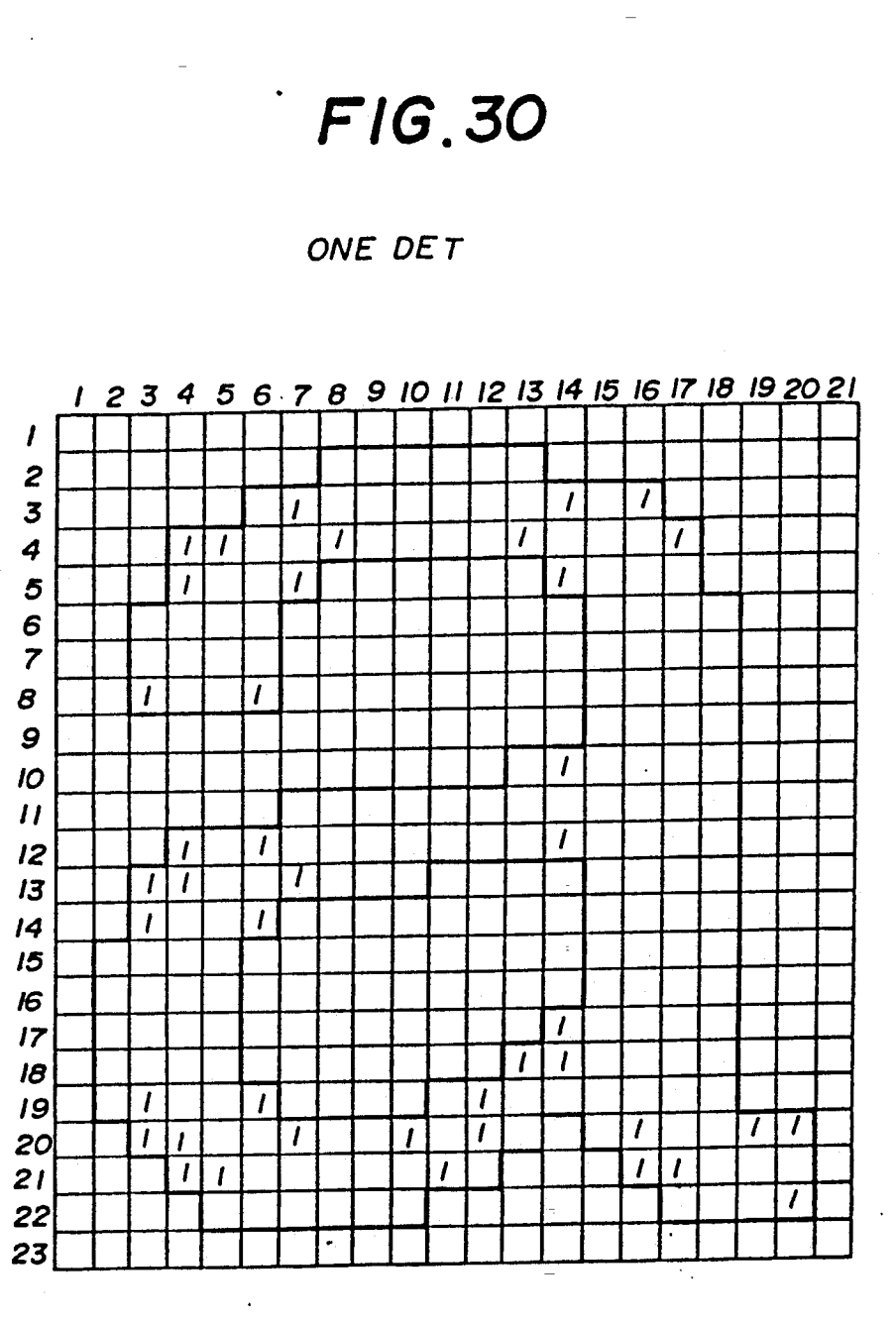

FIG. 29 shows a simulation result of the position computation performed with respect to each target dot of the character image "a", which dot is part of a nearly horizontal or vertical line (with one-dot width). In this drawing, a numeral letter of each target dot indicates the relative position of the target dot to the starting point of the line. This position is the number of successive black dots between the target dot and the starting point. FIG. 30 shows a simulation result of the pattern recognition with regard to one the signals DIR0-1 to detect whether or not the target dot is an isolated dot in the dot pattern.

Figure 31:
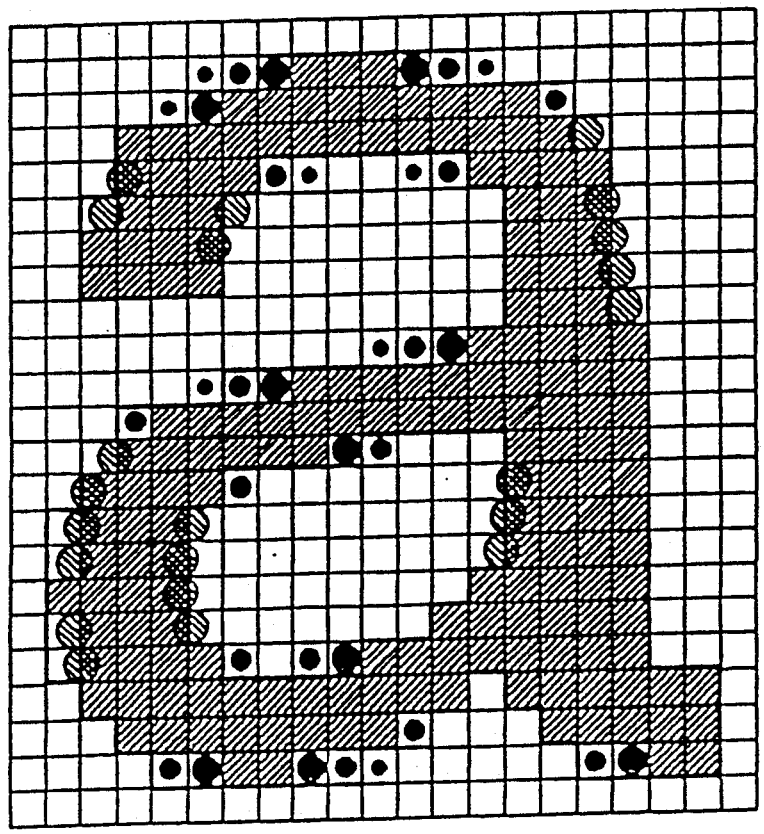
FIG. 31 is a diagram showing the result of the dot correction performed with respect to each target dot of the image shown in FIG. 22.

FIG. 31 shows the result of the dot position performed with respect to each target dot of the input image "a". As described above, the output signals of the pattern recognizing part 74 shown in FIG. 1 are used as address signals input to the pattern memory 75. The output dot data is read from the pattern memory 75 in accordance with the address signals, and the corrected dot pattern shown in FIG. 31 is produced in accordance with the output dot data of the pattern memory 75. In this drawing, a black dot indicates a corrected dot regarding a nearly horizontal line, a shaded circle indicates a corrected dot regarding a nearly vertical line, and a shaded square indicates a non-corrected dot within a black-dot region.

As described above, according to the present invention, how each target dot of an image is corrected is selectively determined in response to the features of the dot within the image being detected. Some dots of the image are corrected according to the predetermined correction data, and the others are not corrected. The pulse duration of laser ON corresponding to a non-corrected black dot is equal to a time duration required to print the full-diameter dot (=10/10 duration), the pulse duration of laser ON corresponding to a white dot is 0% pulse duration (=0/10 duration), and the pulse duration of laser ON corresponding to a corrected black dot with an intermediate diameter is adjusted to an appropriate time duration required to print the corrected dot (=n/10 duration). Thus, according to the present invention, it is possible to eliminate a jaggy from the outline of the image remarkably, so that an image with smooth edges indicating a character or a graphic can be produced. In addition, it is not necessary to prepare and store data of a great number of predetermined templates with which the respective groups of dots sampled from the image are compared, and it is not necessary to take much time to perform the template matching with the stored templates. The dot correction of the present invention can be accomplished with inexpensive hardware, and the data processing for performing the dot correction requires a relatively short time.

In the above described embodiment, the dot corrector, which is the image processing apparatus of the present invention, is provided in the internal interface 6 connecting the controller 3 of the laser printer to the engine driver 4. However, it is possible that the dot corrector is provided in the controller 3 or in the engine driver 4. Also, in the above embodiment, the image processing apparatus of the present invention is applied to the laser printer. However, the present invention is also applicable to other image forming systems such as an LED printer, a digital copier and a facsimile machine.

Next, a description will be described of a second embodiment of the present invention. In the first embodiment described above, the dot correction is performed by assuming that only a one-dot width line is recognized by the pattern recognition part 74. The one-dot width line is more highly influenced by the configuration of the laser beam at the recording unit, than the case of the multiple dot width line. It is desirable to use different types of correction dot data for a thin line with one-dot width and for a broad line with multiple dot width in order to increase the efficiency of data processing and improve the quality of the image.

Figure 32:
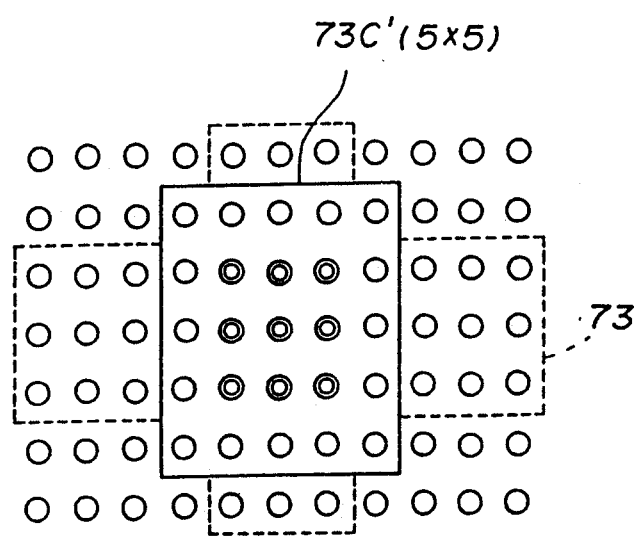
FIG. 32 is a diagram for explaining core and peripheral regions of a window of a second embodiment of the present invention.
Figure 33G:
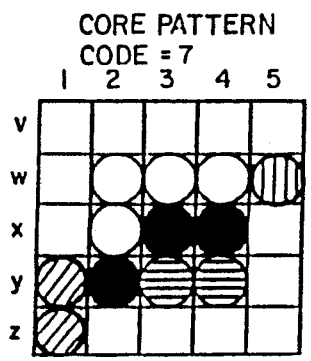
Figure 33H:
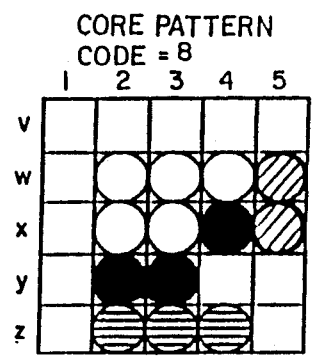
Figure 33I:
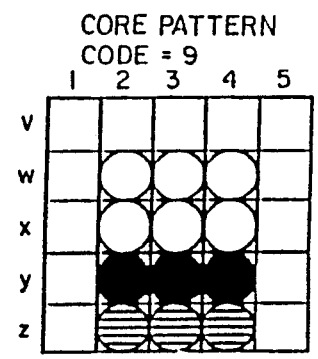
Figure 33J:
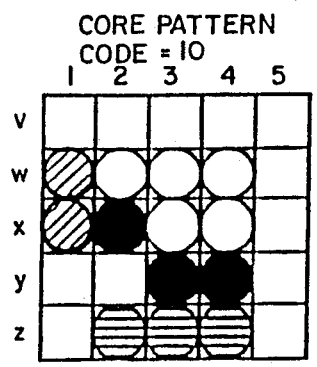
Figure 33K:
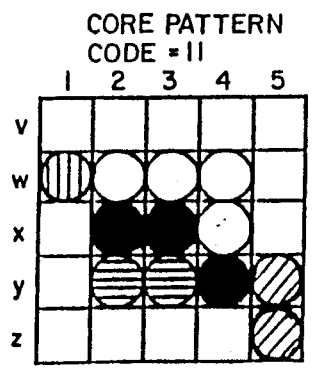
Figure 33L:
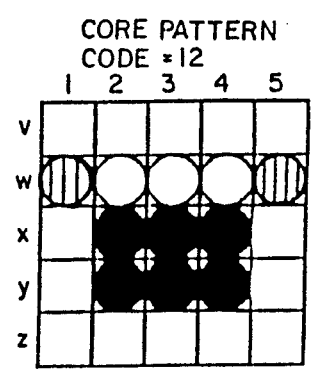
Figure 33M:
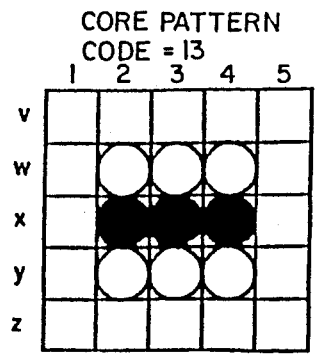
Figure 33O:
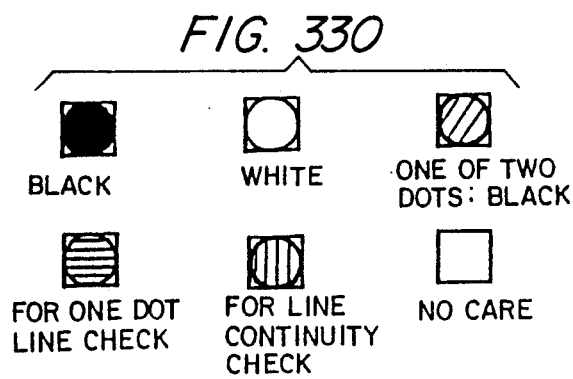

For this purpose, it is necessary to detect whether a line recognized from the sampled dots has a one-dot width or a multiple dot width. In the second embodiment of the present invention, the above mentioned detection is accomplished by using a window 73 having a 5×5 core region 73C', as shown in FIG. 32, for sampling 5×5 dots from an image, and using a plurality of predetermined 5×5 matching patterns shown in FIG. 33A through 33M. Each group of 5×5 dots sampled from the image has a target dot at line "x"and column "3" (the center) of the core region 73C'. The matching patterns shown in these drawings are stored to detect a nearly horizontal line. In order to detect a nearly vertical line, a plurality of predetermined 5×5 matching patterns which are the same as the patterns of FIGS. 13A through 13M being rotated by 90 degrees (around the target dot) are also stored. In the matching patterns of these drawings, a circle shaded by horizontal lines indicates a black dot used for detecting a one-dot width line or not; a circle shaded by diagonal lines indicates as one of two dots being a black dot used for preventing a pseudo outline from occurring; and a circle shaded by vertical lines indicates a black dot used to check whether or not a line is continuous, beyond the core region, to the peripheral regions so that some of the peripheral regions are selected.

In the course of the 5×5 core pattern matching, it is determined whether or not a group of 5 ×5 dots from the input image whose dot pattern of black and white dots accords with one of the matching patterns shown in FIGS. 33A through 33M. A core pattern code of the 5×5 dot group is selected as being one of values ranging from 1 through 13 in accordance with the matched pattern. Then, the one-dot width line detection, the pseudo outline prevention, and the line continuity checking as mentioned above are performed by checking the sampled dots of the core region have a dot pattern which accords with the specified dot pattern of the matched pattern.

In the one-dot width line detection, when a dot pattern of the sampled dots having the determined core pattern code accords with all black dots of the matched pattern indicated by the horizontal-line shaded circle, it is determined that the sampled dots are part of a multiple dot width line. When the dot pattern of the sampled dots includes at least one white dot at positions corresponding to the black dots of the matched pattern indicated by the horizontal-line circle, it is determined that the sampled dots are part of a one-dot width line.

FIG. 50 shows a code assignment of the pattern memory 75 (which is a RAM). In the pattern memory 75, the addresses are input by the signals of the pattern recognition part 74, and a corresponding correction dot data is output in accordance with the input addresses. The H/V, B/W, U/L, DIR0-1, G0-2, and P0-3 signals of the pattern recognition part 74 are assigned to the RAM addresses of the pattern memory 75 as shown in FIG. 50. For example, the result of the one-dot width line detection (detecting whether or not it is a one-dot width line) is indicated by a P3 signal (one-bit flag) of the pattern recognition part 74, one of the position signals P0-3 thereof. This data of the one-bit flag is assigned to "A3" of the RAM address of the pattern memory 75.

Figure 34A:
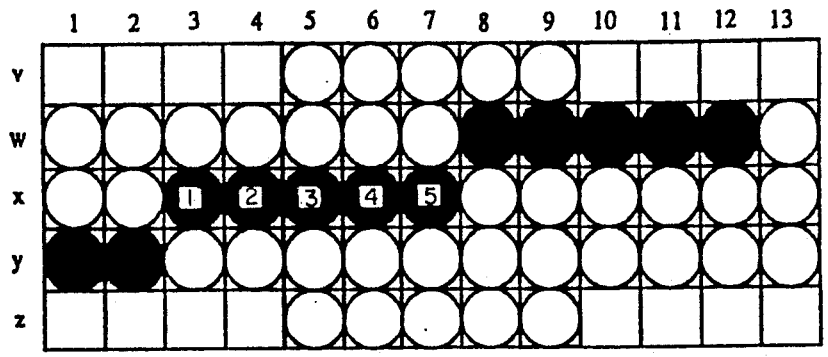
FIGS. 34A and 34B are diagrams for explaining the result of a dot correction when a one-dot width line is detected according to the second embodiment.
Figure 34B:
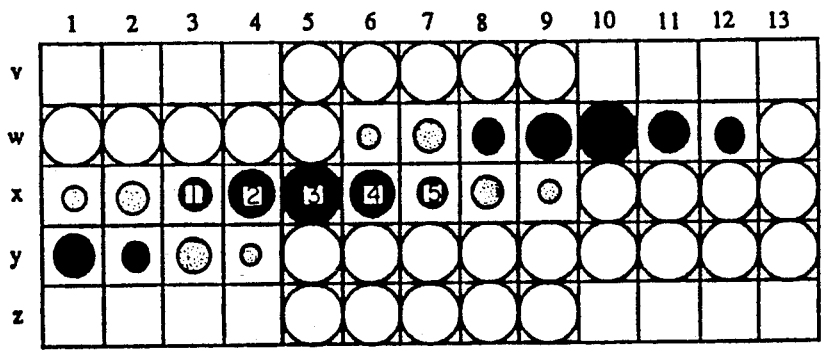
Figure 35A:
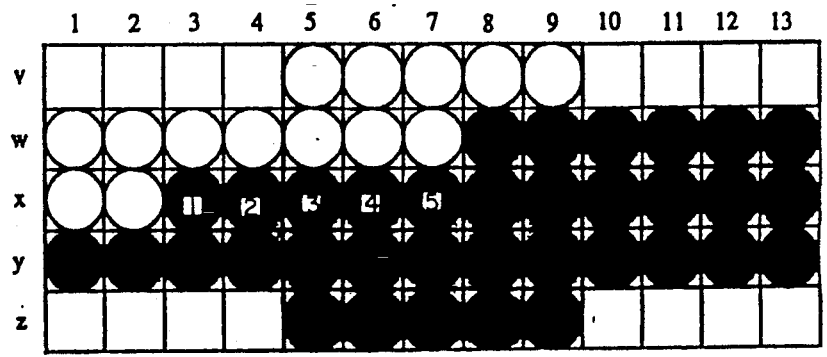
FIGS. 35A and 35B are diagrams for explaining the result of a dot correction of the second embodiment when a multiple-dot width line is detected.
Figure 35B:
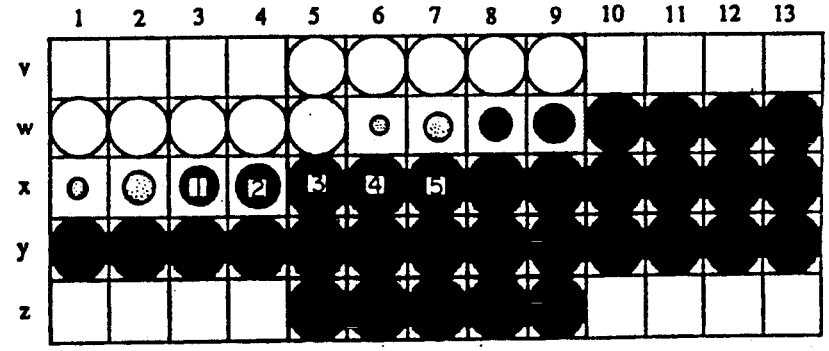
Figure 36A:
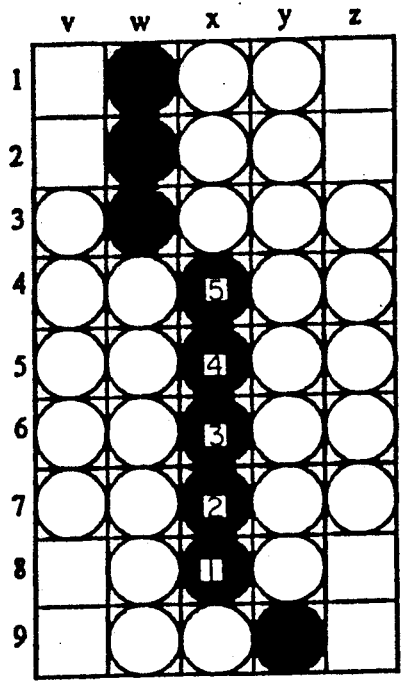
FIGS. 36A and 36B are diagrams for explaining the result of a dot correction when a one-dot width nearly vertical line is detected.
Figure 36B:
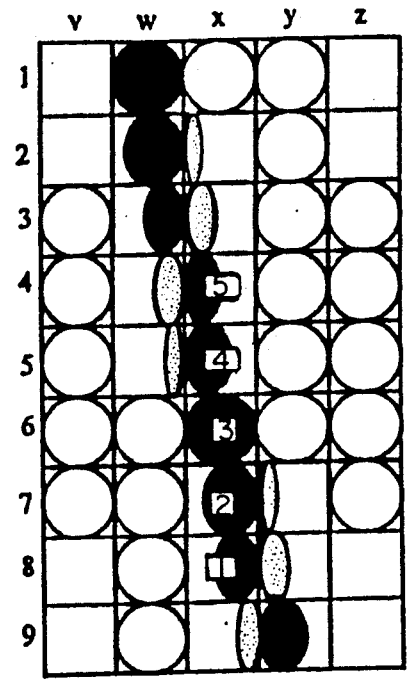
Figure 37A:
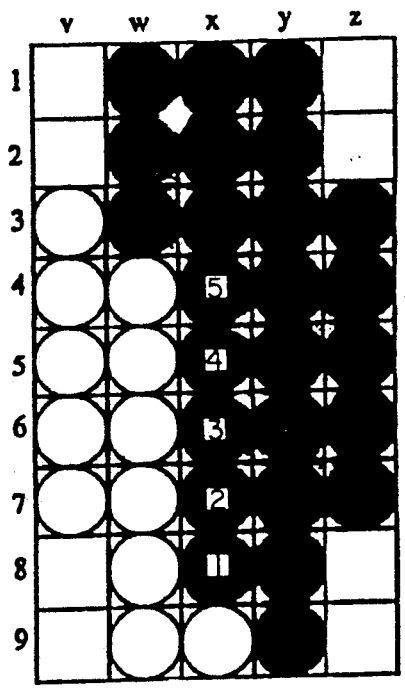
FIGS. 37A and 37B are diagrams for explaining the result of a dot correction when a multiple-dot width nearly vertical line is detected.
Figure 37B:
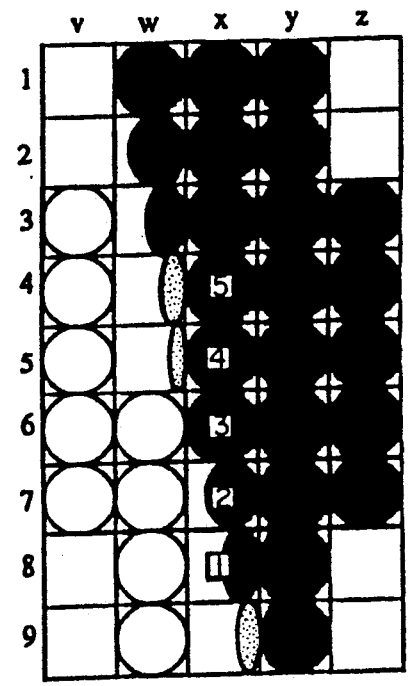

By making use of the above mentioned data at the A3 address of the pattern memory 75, it is possible to use different correction dot data stored in the pattern memory 75 for one-dot width lines and for multiple-dot width lines. FIGS. 34 and 35 show the results of the dot corrections when a one-dot width line is detected and when a multiple-dot width line is detected. When the one-dot width line shown in FIG. 34A is detected, two dots "4" and "5" at line "x" and columns "6" and "7" of the line are corrected by the dot correction of the invention as shown in FIG. 34B. However, when the multiple-dot width line shown in FIG. 35A is detected, the two dots "4" and "5" are not corrected by the dot correction of the invention as shown in FIG. 35B.

In the above described first embodiment, there is a problem in that a distortion is produced in an image if a dot correction for a circular arc is performed in a manner similar to the above described dot correction performed when a nearly horizontal or vertical line is detected. It is desirable to perform a specified dot correction suitable for a circular arc which is detected in a different manner.

In the second embodiment, a circular arc is detected in the window in a manner different from the manner how a nearly vertical or horizontal line is detected. FIGS. 38A through 38D show such a detection performed when a nearly horizontal circular arc shown in FIG. 38A appears in the window. FIGS. 39A through 39D show such a detection when a nearly vertical circular arc appears in the window. A setting flag is provided in the pattern memory of this embodiment, and a corresponding code signal is produced by the pattern recognition part 74 and stored at a corresponding address of the pattern memory 75.

When a nearly vertical or horizontal line is detected, the direction factor of each target dot is determined according to the position of each dot relative to the line. When a dot correction of this embodiment is performed for a circular arc being detected, the pattern recognition part 74 outputs a signal indicating the configuration of the arc is upwardly convex or downwardly convex. A correction dot data which is optimized according to the position of each target dot relative to the arc is read from the pattern memory 75.

Figure 38A:
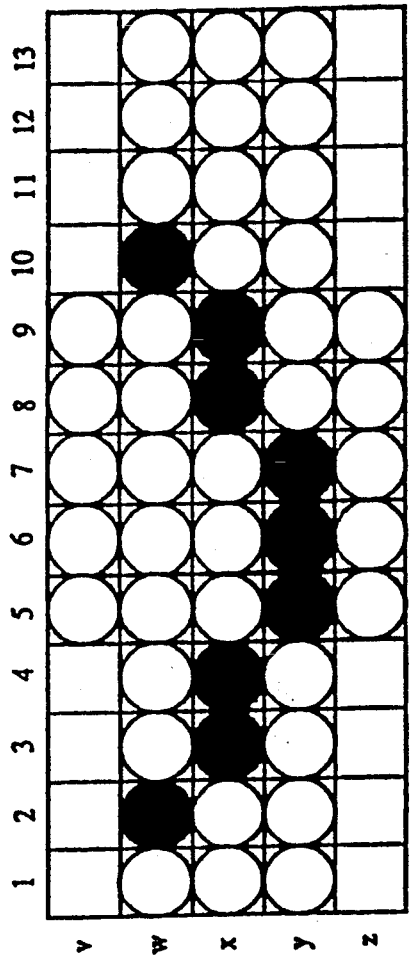
FIGS. 38A through 38D are diagrams for explaining the detection of a dot pattern when a nearly horizontal circular arc appears in the window.
Figure 38D:
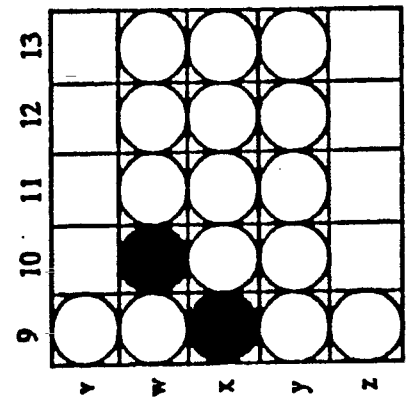
Figure 38C:
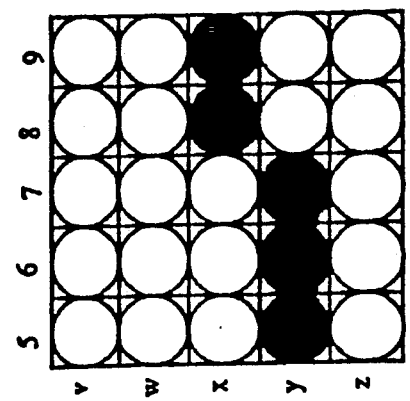
Figure 38B:
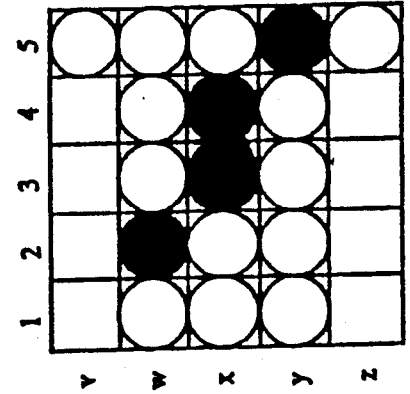
Figure 39B:
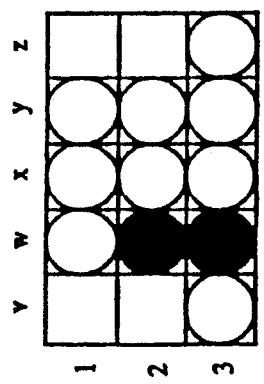
FIGS. 39A through 39D are diagrams for explaining the detection of a dot pattern when a nearly vertical circular arc appears in the window.
Figure 39C:
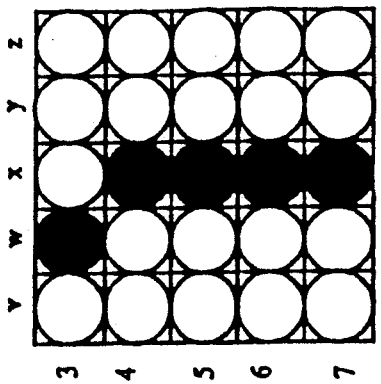
Figure 39D:
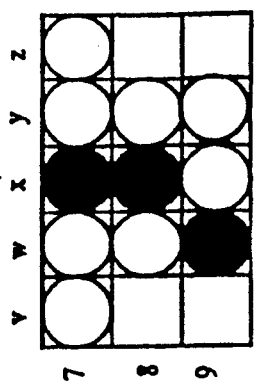
Figure 39A:
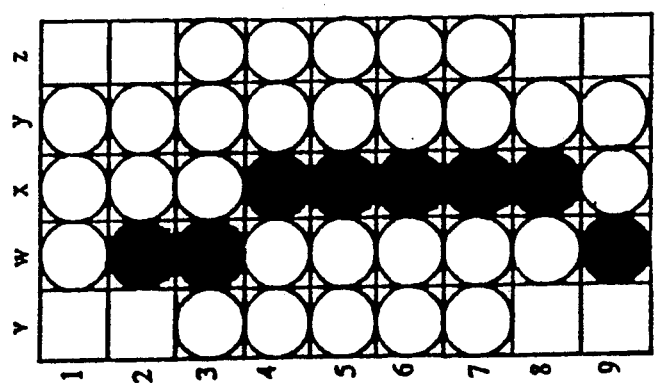

Dot patterns shown in FIGS. 38B through 38D are respectively sampled from the input image by the left peripheral region 73L, the core region 73C and the right peripheral region 73R. The core recognizing part 741 checks the continuity of a line in the window 74 with respect to each target dot, and then, by using the output signals of the peripheral recognizing part 742, determines it is needed to select only the left recognizing part 742L. The core recognizing part 741 outputs the signals DIR0-1 indicating a direction factor equal to "01" (left-hand down and right-hand up), while the left peripheral portion 742L outputs the signals DIR0-1 indicating a different direction factor equal to "10" (left-hand up and right-hand down). Since the signals DIR0-1 indicating different direction factors are received, the discriminator 747 detects that it is part of a circular arc, and outputs corresponding signals DIR0-1 to the pattern memory 75 (see the RAM address "A9" of the pattern memory of FIG. 50).

Figure 40B:
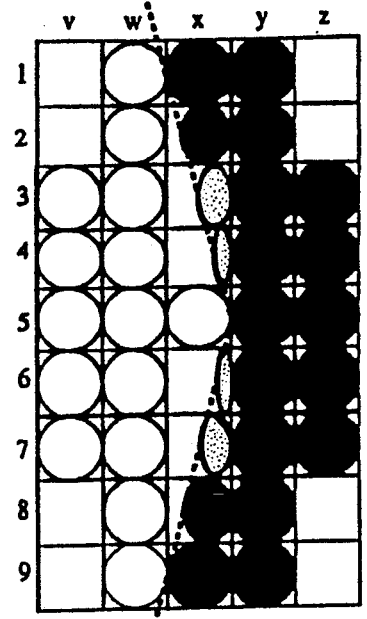
FIGS. 40A through 40C are diagrams for explaining the result of a dot correction when a nearly vertical circular arc is detected.
Figure 40A:
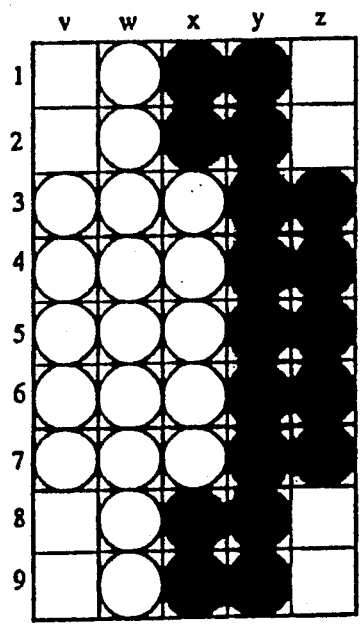
Figure 40C:
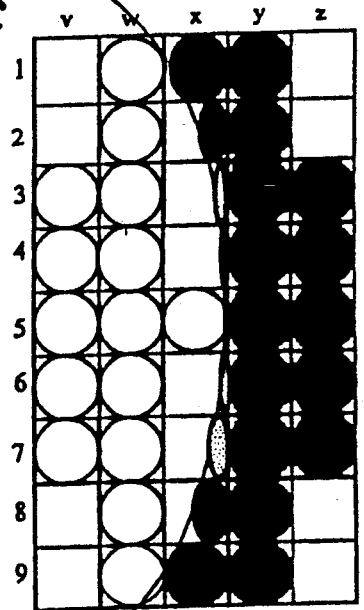
Figure 41A:
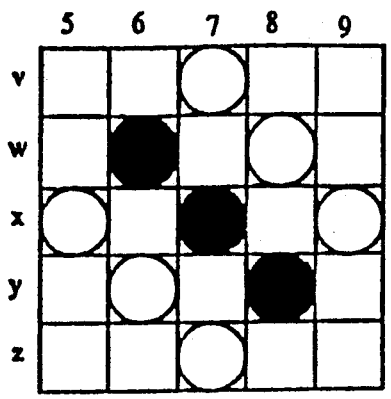
FIGS. 41A through 41F are diagrams showing a set of predetermined 5×5 core matching patterns for detecting an isolated dot in the window.
Figure 41B:
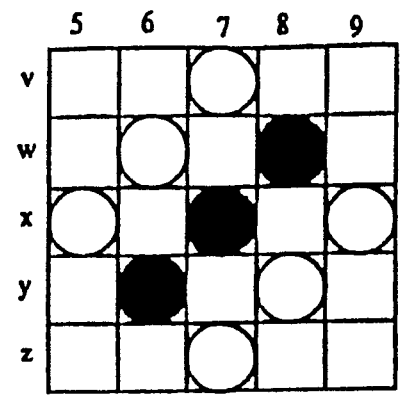
Figure 41C:
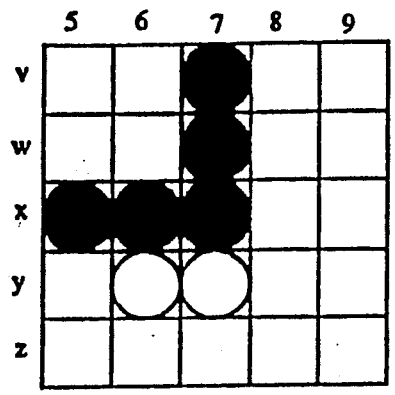
Figure 41D:
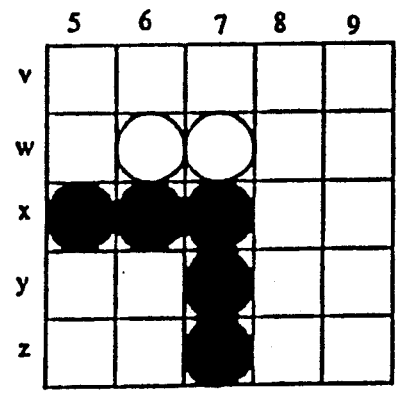
Figure 41E:
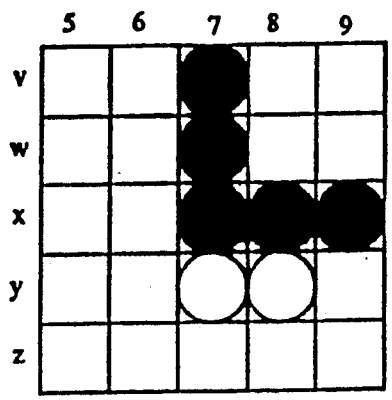
Figure 41F:
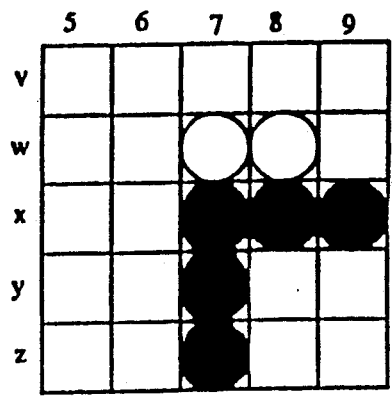

FIGS. 40B and 40C respectively show the result of a dot correction performed when a nearly vertical line is detected as shown in FIG. 40A, and the result of a dot correction performed when a horizontal circular arc is detected as shown in FIG. 40A.

Figure 42A:
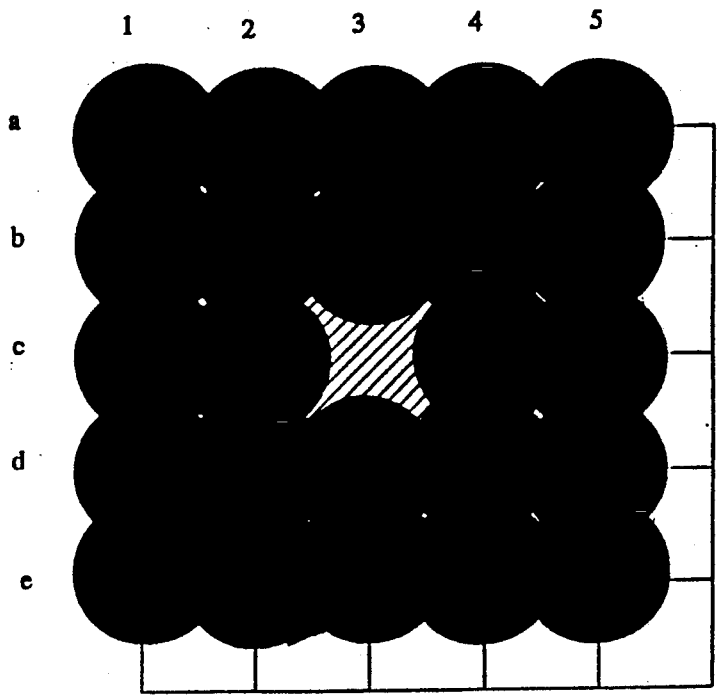
FIGS. 42A and 42B are diagrams for explaining the result of a dot correction when an isolated dot is detected.

Generally, the diameter of a laser beam spot corresponding to one dot of an image is set to a somewhat larger diameter at the recording unit such that adjacent black dots with full diameter overlap with each other. Thus, when an isolated white dot is within a black dot region or within a halftone pattern, the image of such a dot is collapsed due to the setting of the laser beam spot as shown in FIG. 42A. In order to eliminate the above mentioned problem, a specified dot correction is performed for an isolated white dot in the second embodiment.

Figure 42B:
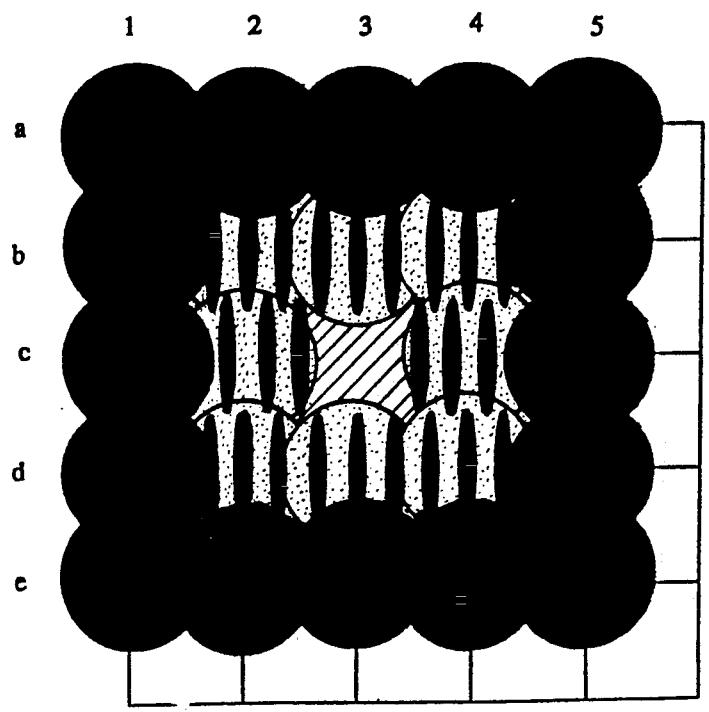

When a 5×5 dot pattern is sampled at the window 73 of the second embodiment, which is different from the matching patterns shown in FIGS. 33A through 33M and from the matching patterns shown in FIGS. 41A through 41F, it is determined at the pattern recognizing part 74 that some dots of the sampled dot pattern are isolated dots. These isolated dots are subjected to the specified dot correction, and the result of the dot correction is shown in FIG. 42B.

Generally, due to the characteristics of the light source of the laser beam printer, there is a problem in that the image of a one-dot width vertical line has a width that is smaller than that of the image of a one-dot horizontal line. In order to eliminate the above mentioned problem, a specified dot correction is performed when a one-dot width vertical line is detected in the second embodiment. In this dot correction, a set of correction dots with "1/n" dot width is added to the detected vertical line at both right and left sides thereof.

Figure 43A:
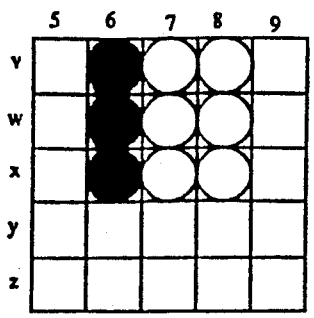
FIGS. 43A through 43E are diagrams for explaining the result of a dot correction to correct the width of a one-dot width vertical line so as to be equal to the width of a horizontal line.
Figure 43B:
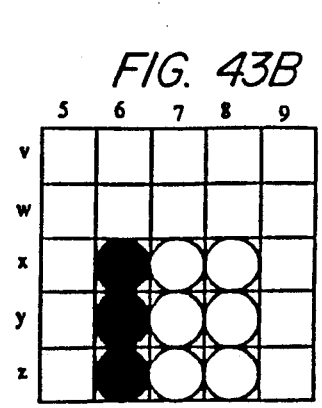
Figure 43C:
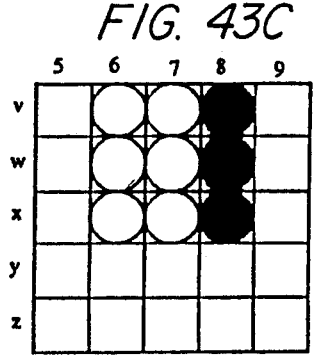
Figure 43D:
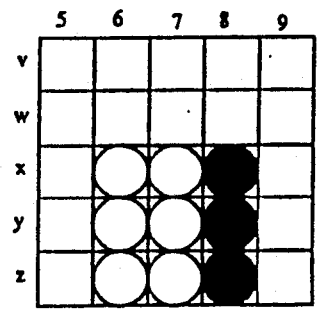
Figure 43E:
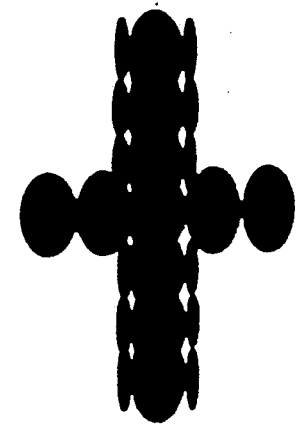

FIGS. 43A through 43D show a set of predetermined matching patterns used for detecting a one-dot width vertical line, and FIG. 43E shows the result of the dot correction to correct the width of a one-dot vertical line to be substantially equal to that of a one-dot horizontal line.

Also, due to the characteristics of the light source of the laser beam printer, there is a problem in that the image of a one-dot width 45-deg line has a width that is smaller than that of the image of a one-dot horizontal line. Therefore, when a one-dot width 45-deg line is detected, it is desirable to perform a dot correction for thickening the detected line, which is similar to the dot correction performed when a one-dot width verticalline is detected. In this dot correction, a correction dot with "1/n" dot width is added to each dot of the detected 45-deg line at both right and left sides thereof.

Figure 44A:
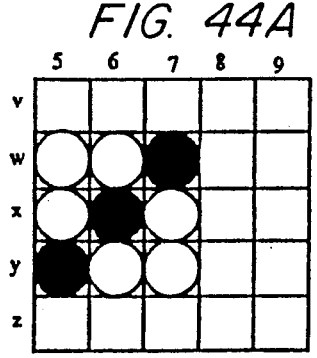
FIGS. 44A through 44E are diagrams for explaining the result of a dot correction to correct the width of a one-dot width 45-deg line so as to be equal to the width of a horizontal line.
Figure 44B:
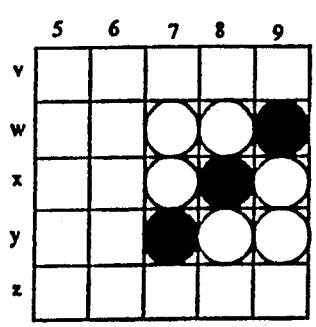
Figure 44C:
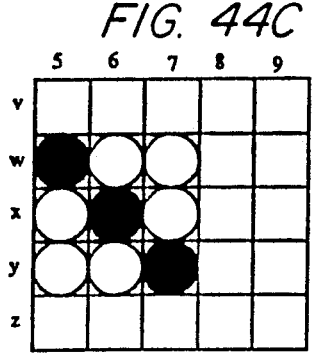
Figure 44D:
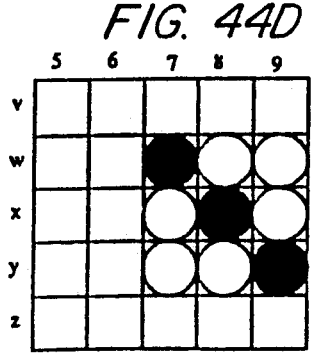
Figure 44E:
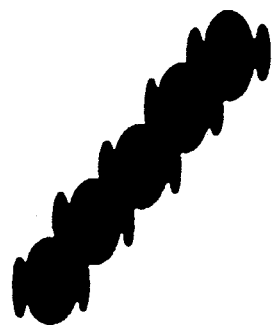

FIGS. 44A through 44D show a set of predetermined matching patterns used for detecting a one-dot width 45-deg line, and FIG. 44E shows the result of the dot correction to correct the width of a one-dot 45-deg line to be substantially equal to that of a one-dot horizontal line.

Figure 45A:
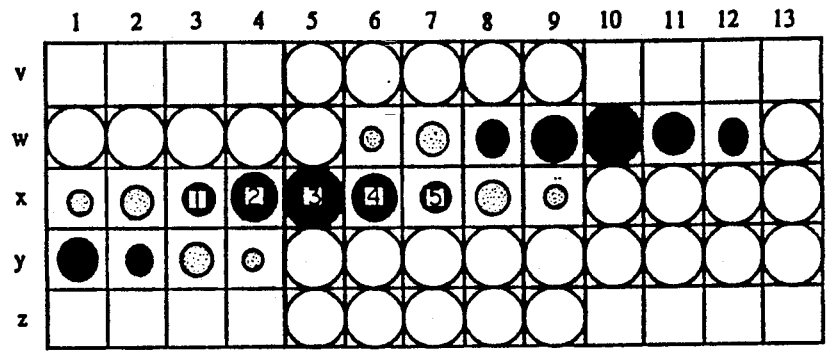
FIGS. 45A and B through 48A and B are diagrams for explaining an improvement of position computation to reduce the required capacity of a pattern memory used in the image processing apparatus.
Figure 45B:
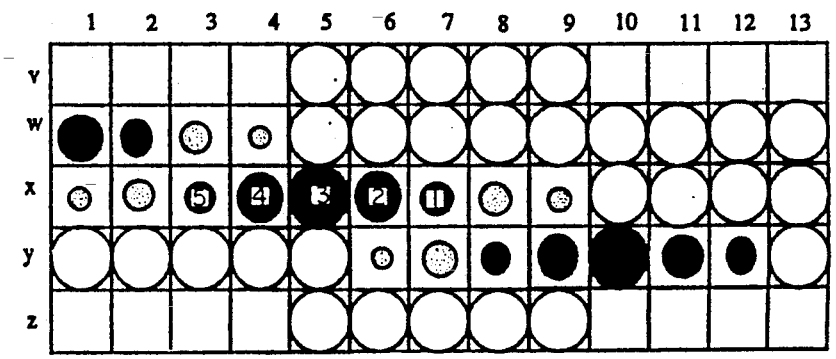

In the second embodiment, it is possible to reduce the capacity of the pattern memory 75 required to store correction dot data corresponding to the signals produced at the pattern recognizing part 74, by improving the position computation at the pattern recognition part 74, thereby decreasing the cost of the image processing apparatus. As the example of the improved position computation, it is assumed that a set of correction dot data "1" through "5" as shown in FIG. 45A is stored in the pattern memory 75 when the position signals of a one-dot width nearly horizontal line (whose direction factor indicates a direction of left-hand down, right-hand up) is produced. The same data stored in the pattern memory 75 can be used by replacing the position numbers of the respective target dots when position signals of a nearly horizontal line (left-hand up and right-hand down) as shown in FIG. 45B. The replacement of the position numbers is made as follows:

*new position number* $= (G+1) - P$ where G and P are the Gradient and Position which are represented according to the above formulas (1) and (2).

Figure 46A:
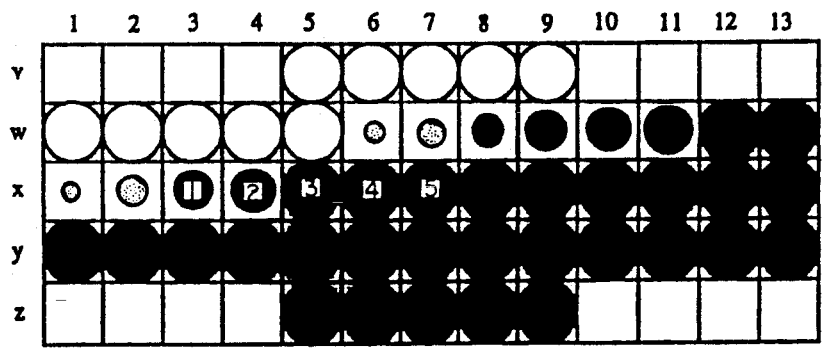
Figure 46B:
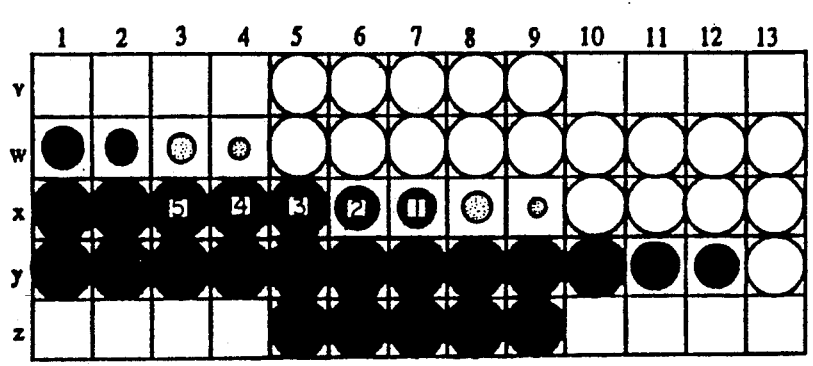
Figure 47A:
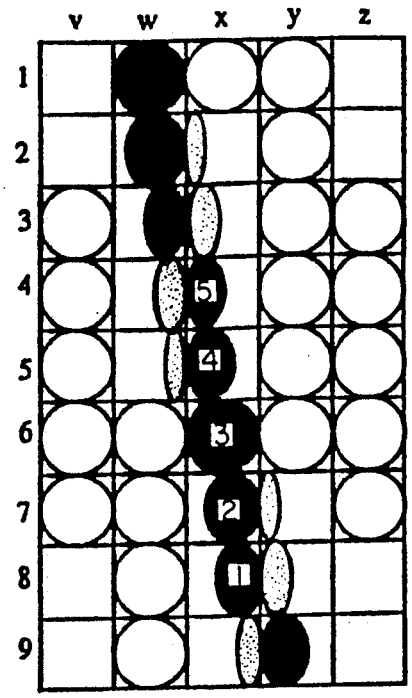
Figure 47B:
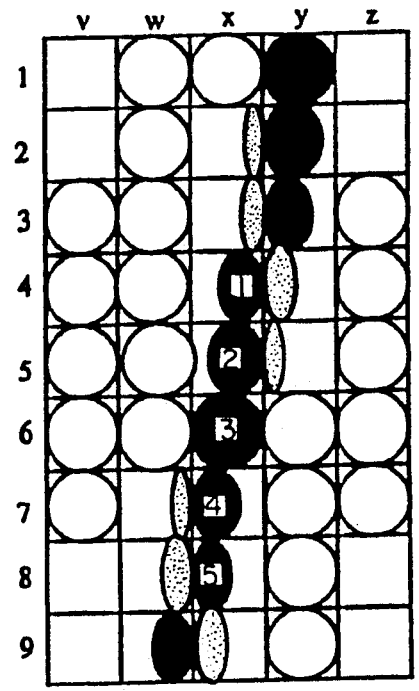
Figure 48A:
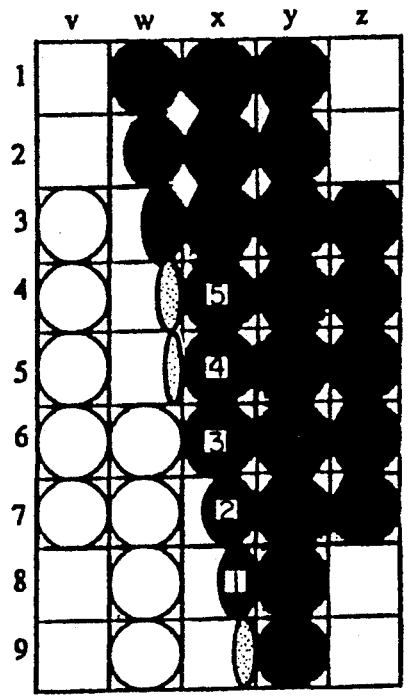
Figure 48B:
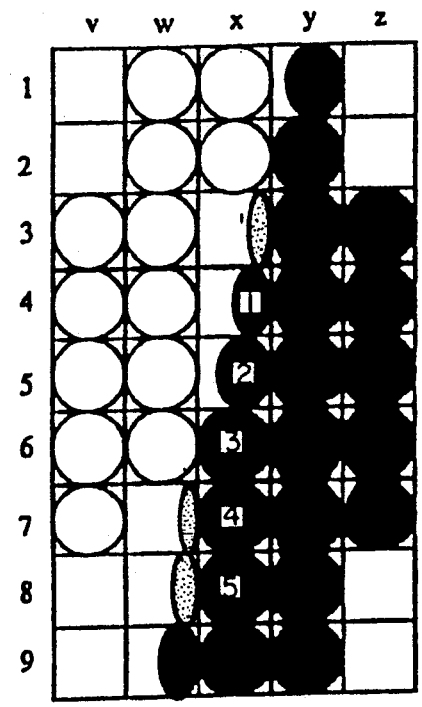

FIGS. 46A and 46B show the above mentioned improvement of the position computation in a case where a multiple-dot width, nearly horizontal line is detected. FIGS. 47A and 47B show the above improvement of the position computation in a case where a one-dot width, nearly vertical line is detected. FIGS. 48A and 48B show the above improvement of the position computation in a case where a multiple-dot with, nearly vertical line is detected.

Figure 49B:
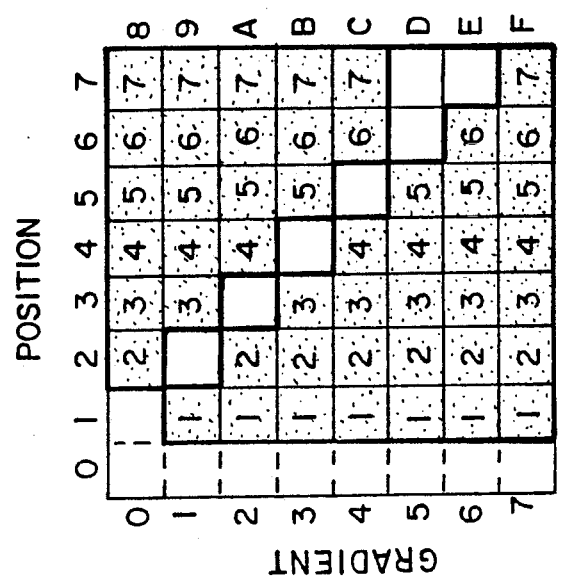
FIGS. 49A and 49B are diagrams for explaining an improvement of code assignment in the pattern memory to reduce the required capacity of the pattern memory.
Figure 49A:
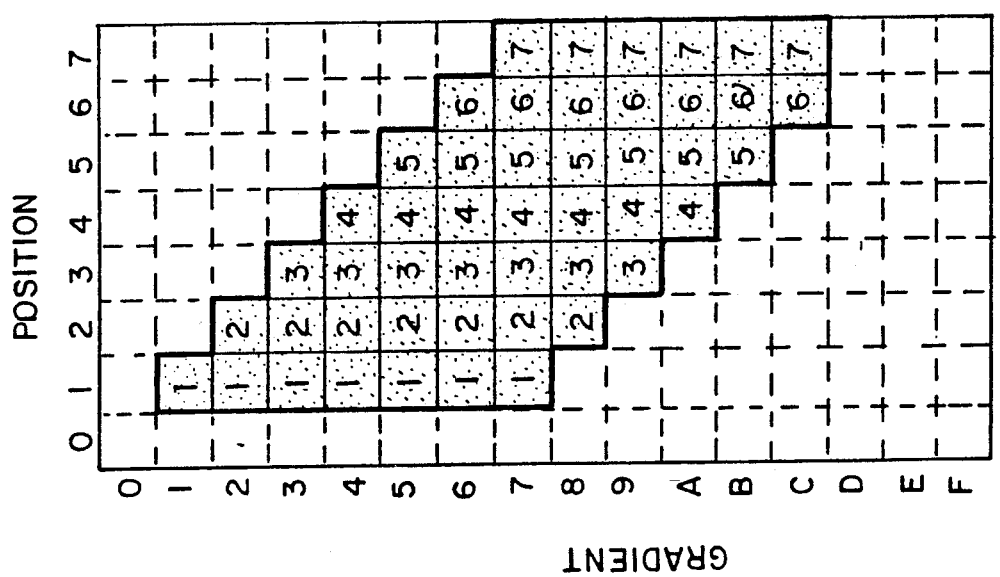

As shown in FIG. 49A, in a case of an m x n window being used in the image processing apparatus, a value of a position signal can be produced when a nearly horizontal line has a gradient value equal to or smaller than $(n+1)/2$. However, when the horizontal line has a gradient value greater than $(n+1)/2$, the entire range of the value of the position signal cannot be produced. By making use of a code assignment of the pattern memory shown in FIG. 49B, it is possible to save the required capacity of the pattern memory.

Further, the present invention is not limited to the above described embodiments, and variations and modifications may be made without departing from the scope of the present invention.

What is claimed is:

1. An image processing apparatus for, smoothing edges of an image having a plurality of dots arranged in a dot matrix formation, said image processing apparatus comprising:

sampling means for sampling a group of dots from an image having a plurality of input black and white dots arranged in columns and lines, said group of dots being included in a prescribed region of the image, having a target dot at the center of the region, and being sampled with respect to each dot of the image;

pattern recognition means for recognizing a dot pattern from said sampled dots of said sampling means, said dot pattern being described by successive black dots and located at a boundary between a black dot region of the image and a white dot region thereof, and for producing a set of code signals with respect to each target dot from the result of the recognition, said code signals defining features of the recognized dot pattern for each target dot;

discrimination means for detecting whether or not each target dot is part of an inclined line having a gradient relative to the horizontal or vertical direction, in response to at least one of the code signals of said pattern recognition means, so that it is determined whether or not each target dot is to be corrected in order for smoothing edges of the image;

correction means having a pattern memory in which a set of predetermined correction dot data is stored, for inputting said code signals of said pattern recognition means to said pattern memory as address inputs when it is determined that the target dot is to be corrected, and for reading a corresponding correction dot data from said pattern memory in accordance with said code signals for each target dot; and output means for outputting an image with corrected dots which are in accordance with the correction dot data of said correction means for each target dot.

2. An image processing apparatus according to claim 1, wherein said code signals produced for each target dot at said pattern recognition means comprise a direction signal indicating a value of a direction factor of the dot pattern, a gradient signal indicating a value of a gradient of the dot pattern relative to horizontal direction or vertical direction, and a position signal indicating a position of each target dot relative to a starting dot out of horizontally or vertically successive black dots of the dot pattern.

3. An image processing apparatus according to claim 1, wherein said sampling means comprises a plurality of shift registers connected to a plurality of line buffers in series, each group of dots in the image having said input black and white dots being supplied to said shift registers via said line buffers, the number of said shift registers and the number of bits contained in each shift register corresponding to a two-dimensional size of the region in which each group of dots are included.

4. An image processing apparatus according to claim 1, wherein said discrimination means detects whether or not each target dot is part of said inclined line, in response to a value of a direction factor indicated by a direction signal which is one of the code signals produced at said pattern recognition means.

5. An image processing apparatus according to claim 4, wherein, when the dot pattern is a horizontal or vertical line or when it accords with one of predetermined matching patterns used for detecting a nearly horizontal line or a nearly vertical line, the value of the direction factor indicated by the direction signal is not equal to zero, so that it is determined by said discrimination means that the target dot is to be corrected, and wherein, when the dot pattern accords with one of predetermined matching patterns used for detecting a 45-degree line, the value of the direction factor is equal to zero, so that it is determined that the target dot is not to be corrected.

6. An image processing apparatus according to claim 1, wherein said discrimination means detects whether or not each target dot is part of a one-dot width line by comparing the sampled dots with any of predetermined matching patterns used for checking a one-dot width line or not.

7. An image processing apparatus according to claim 6, wherein said correction means inputs the code signals to the pattern memory and reads a corresponding correction dot data therefrom when the target dot is detected as being part of a one-dot width line, and when the target dot is detected as being part of a multiple-dot width line, said correction means does not input the code signals to the pattern memory.

8. An image processing apparatus according to claim 1, wherein said sampling means comprises a core portion for sampling dots with the target dot in a core area of said region, and a plurality of peripheral portions for sampling dots in each of four peripheral areas which are located above, below, left to, and right to said core area.

9. An image processing apparatus according to claim 8, wherein said pattern recognition means comprises a core recognizing part for recognizing a feature of the dot pattern from the sampled dots of said core area by comparing said sampled dots with one of predetermined matching patterns, and said pattern recognition means comprises a peripheral recognizing part for recognizing a feature of the dot pattern from the sampled dots in one or more peripheral areas of the sampling means, said one or more peripheral areas being selected from said four peripheral areas in response to the recognized feature of said core recognizing part.

10. An image processing apparatus according to claim 9, wherein said pattern recognition means comprises a position computing part for producing a position signal from a combination of the results of the recognition by the core recognizing part and the recognition by the peripheral recognizing part, and said position signal being produced by computing the number of horizontally successive black dots of the dot pattern from a left-hand end dot thereof to the target dot or the number of vertically successive black dots from a bottom end dot thereof to the target dot as a value of a position of the target dot relative to the dot pattern.

11. An image processing apparatus according to claim 9, wherein said code signals produced at said pattern recognition means further comprise a H/V signal indicating whether the dot pattern is a nearly horizontal line or a nearly vertical line, a B/W signal indicating whether the target dot is black or white, and a U/L signal indicating a location of the target dot relative to the dot pattern.

12. An image processing apparatus according to claim 9, wherein said pattern recognition means comprises a gradient computing part for producing a gradient signal from a combination of the results of the recognition by the core recognizing part and the recognition by the peripheral recognizing part, and said gradient signal being produced by computing the number of horizontally or vertically successive black dots of the dot pattern as a value of a gradient relative to horizontal or vertical direction.

13. An image processing apparatus according to claim 9, wherein said core recognizing part produces a direction signal indicating a value of a direction factor of the dots in the core area and said peripheral recognizing part produces a direction signal indicating a value of a direction factor of the sampled dots in one or more peripheral areas, so that, when the direction signal produced at said core recognizing part and the direction signal produced at said peripheral recognizing part indicate different values of the direction factors, said discrimination means detects that the dot pattern is part of a circular arc.

14. An image processing apparatus according to claim 9, wherein said code signals produced at said pattern recognition means further comprises a GST signal indicating whether or not each target dot is a starting dot out of horizontally or vertically successive black dots of the dot pattern, an RUC signal indicating whether or not a black dot continuous to the successive black dots within the core area exists in the right or upper peripheral area of the region, a CC signal indicating the number of the successive black dots within the core area, and an LLC signal indicating whether or not a black dot continuous to the successive black dots within the core area exists in the left or lower peripheral area of the region.

15. An image processing apparatus according to claim 14, wherein said peripheral recognizing part produces an RUDIR signal indicating a value of a gradient of successive black dots within the right or upper peripheral area when the RUC signal indicates that said black dot exists continuously, and said peripheral recognizing part producing an LLDIR signal indicating a value of a gradient of successive black dots within the left or lower peripheral area when the LLC signal indicates that the continuous black dot exists.

16. An image processing apparatus according to claim 14, wherein said peripheral recognizing part produces an RUCN signal indicating the number of successive black dots within the right or upper peripheral area when the RUC signal indicates that the continuous black dot exists, and said peripheral recognizing part producing an LLCN signal indicating the number of successive black dots within the left or lower peripheral area when the LLC signal indicates the the continuous black dot exists.

17. A method for smoothing edges of an image having a plurality of dots arranged in a dot matrix formation, said method comprising steps of:

sampling a group of dots from an image having a plurality of input black and white dots arranged in columns and lines, said group of dots being included in a prescribed region of the image, having a target dot at the center of the region, and being sampled with respect to each dot of the image;

recognizing a dot pattern from said sampled dots, said dot pattern being described by successive black dots and located at a boundary between a black dot region of the image and a white dot region thereof;

producing a plurality of code signals with respect to each target dot from the result of the recognition, said code signals defining features of the recognized dot pattern with respect to each target dot;

detecting whether or not each target dot is part of an inclined line having a gradient relative to horizontal direction or vertical direction, in response to at least one of the code signals, thus determining whether or not each target dot is to be corrected for smoothing edges of the image;

inputting said code signals for each target dot to a pattern memory as address inputs when it is determined that the target dot is to be corrected;

reading a corresponding correction dot data from said pattern memory in accordance with said code signals for each target dot; and outputting an image with corrected dots which are in accordance with the correction dot data of the pattern memory for each target dot.

18. A method according to claim 17, wherein said plurality of code signals produced for each target dot in said producing step include a direction signal indicating a value of a direction factor of the dot pattern, a gradient signal indicating a value of a gradient of the dot pattern relative to horizontal direction or vertical direction, and a position signal indicating a relative position of each target dot relative to a starting dot out of horizontally or vertically successive black dots of the dot pattern.

19. A method according to claim 17, wherein said sampling step comprises substeps of sampling dots with the target dot in a core area of the region; and sampling peripheral dots in each of four peripheral areas within the region which are located above, below, left to, and right to the core areas.

20. A method according to claim 17, wherein said recognizing step comprises substeps of recognizing a feature of the dot pattern from the sampled dots of said core area by comparing said sampled dots with one of a plurality of predetermined matching patterns; and recognizing a feature of the dot pattern from the sampled dots in one or more peripheral areas which are selected from said four peripheral areas in accordance with the recognized feature of the dot pattern from the sampled dots of said core area.

* * * * *